(12) United States Patent
Selvanesan et al.

(10) Patent No.: US 12,156,222 B2
(45) Date of Patent: Nov. 26, 2024

(54) RESOURCE POOL DESIGN FOR GROUP COMMUNICATIONS

(71) Applicant: Fraunhofer-Gesellschaft zur Förderung der angewandten Forschung e.V., Munich (DE)

(72) Inventors: Sarun Selvanesan, Berlin (DE); Thomas Fehrenbach, Berlin (DE); Cornelius Hellge, Berlin (DE); Roya Ebrahim Rezagah, Berlin (DE); Thomas Wirth, Berlin (DE); Thomas Schierl, Berlin (DE); Robin Thomas, Berlin (DE); Baris Göktepe, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 399 days.

(21) Appl. No.: 17/210,002

(22) Filed: Mar. 23, 2021

(65) Prior Publication Data

US 2021/0282121 A1 Sep. 9, 2021

Related U.S. Application Data

(63) Continuation of application No. PCT/EP2019/075357, filed on Sep. 20, 2019.

(30) Foreign Application Priority Data

Sep. 26, 2018 (EP) ..................................... 18197008

(51) Int. Cl.
*H04W 72/23* (2023.01)
*H04W 74/0808* (2024.01)
(Continued)

(52) U.S. Cl.
CPC ....... *H04W 72/23* (2023.01); *H04W 74/0808* (2013.01); *H04W 4/40* (2018.02); *H04W 72/0453* (2013.01); *H04W 92/18* (2013.01)

(58) Field of Classification Search
None
See application file for complete search history.

(56) References Cited

U.S. PATENT DOCUMENTS 10,397,900 B2   8/2019   Adachi et al.
10,575,283 B2   2/2020   Tang
(Continued)

FOREIGN PATENT DOCUMENTS

CN   104822141 A   8/2015
CN   104954976 A   9/2015
(Continued)

OTHER PUBLICATIONS

Samsung, "Discussion on resource allocation mechanisms for NR V2X [online]", 3GPP TSG RAN WG1 #94R1-1808778, Aug. 11, 2018.
(Continued)

*Primary Examiner* — Clemence S Han
(74) *Attorney, Agent, or Firm* — NKL Law; Jae Youn Kim

(57) ABSTRACT

An apparatus for a wireless communication system includes a plurality of base stations and a plurality of UEs. The apparatus is to be connected to a base station for a communication with the base station, and one or more UEs via a sidelink for a sidelink communication. The apparatus and the one or more UEs form a group of user devices. The apparatus is to request from a base station, directly or indirectly, resources for a sidelink communication with the one or more UEs of the group, and is to obtain from the base station, directly or indirectly, information about at least one
(Continued)

set of resources to be used for the sidelink communication within the group. Each of the sets of resources is only or exclusively used within the group, and the group members include the apparatus and the one or more UEs of the group.

16 Claims, 23 Drawing Sheets

(51) Int. Cl.
    *H04W 4/40*           (2018.01)
    *H04W 72/0453*      (2023.01)
    *H04W 92/18*         (2009.01)

(56) References Cited

U.S. PATENT DOCUMENTS

| | | | |
|---|---|---|---|
| 2014/0094138 A1 | 4/2014 | Saker et al. | |
| 2014/0094183 A1 | 4/2014 | Gao et al. | |
| 2015/0215760 A1 | 7/2015 | Wei et al. | |
| 2016/0234754 A1 | 8/2016 | Baghel | |
| 2016/0330728 A1 | 11/2016 | Sorrentino et al. | |
| 2016/0353416 A1 | 12/2016 | Takano | |
| 2017/0245245 A1 | 8/2017 | Kim et al. | |
| 2017/0257876 A1 | 9/2017 | Loehr et al. | |
| 2018/0020432 A1 | 1/2018 | Rico Alvarino et al. | |
| 2019/0082421 A1 | 3/2019 | Sartori et al. | |
| 2019/0253919 A1* | 8/2019 | Wu | H04W 72/1263 |
| 2019/0254062 A1* | 8/2019 | Wu | H04W 72/23 |
| 2019/0268918 A1* | 8/2019 | Baghel | H04W 72/54 |
| 2019/0274121 A1* | 9/2019 | Wu | H04W 48/10 |
| 2019/0372739 A1 | 12/2019 | Li et al. | |
| 2019/0380142 A1* | 12/2019 | Wang | H04W 72/20 |
| 2020/0029318 A1* | 1/2020 | Guo | H04L 1/1822 |
| 2020/0045719 A1 | 2/2020 | Wang et al. | |
| 2020/0052829 A1* | 2/2020 | Bendlin | H04W 76/11 |
| 2020/0053524 A1* | 2/2020 | Novlan | H04W 84/20 |
| 2020/0092685 A1* | 3/2020 | Fehrenbach | H04W 72/23 |
| 2020/0178217 A1 | 6/2020 | Huang et al. | |
| 2020/0221423 A1 | 7/2020 | Wang et al. | |
| 2021/0068125 A1 | 3/2021 | Lin et al. | |
| 2021/0211845 A1* | 7/2021 | Lin | H04W 4/40 |

FOREIGN PATENT DOCUMENTS

| | | |
|---|---|---|
| CN | 106304351 A | 1/2017 |
| CN | 107079530 A | 8/2017 |
| CN | 107211470 | 9/2017 |
| EP | 3206452 A1 | 8/2016 |
| JP | 2018-509072 A | 3/2018 |
| WO | 2015/032436 A1 | 3/2015 |
| WO | 2015/046155 A1 | 4/2015 |
| WO | 2016045094 | 3/2016 |
| WO | 2016/188250 A1 | 12/2016 |
| WO | 2017/026463 A1 | 2/2017 |
| WO | 2017/185369 A1 | 11/2017 |
| WO | 2018/124776 A1 | 7/2018 |
| WO | 2018/201415 A1 | 11/2018 |
| WO | 2019/031926 A1 | 2/2019 |
| WO | 2020/030688 A1 | 2/2020 |
| WO | 2020/064555 A1 | 4/2020 |

OTHER PUBLICATIONS

Ericsson, "Radio Resource Management for NR Sidelink Communication [online]", R1-1809304, Aug. 10, 2018.
Shinjiro Yoshimura, "Office Action for JP Application No. 2021-517220", Jun. 28, 2022, JPO, Japan.
U.S. Appl. No. 62/696,589 (Year: 2018).
Rushil P. Sampat, Non-Final Office Action regarding U.S. Appl. No. 17/249,902, (filed May 2, 2023).
3GPP TS 23.303, "Proximity-based services (ProSe); Stage 2 (Release 15)", V15.1.0, Jun. 2018, pp. 1-130.
3GPP TR 22.886 V16.0.0, "Study on enhancement of 3GPP Support for 5G V2X Services", V15.1.0, Jun. 2018, pp. 1-130.
Intel Corporation, "Resource allocation for D2D communication", 3GPP Draft; R2-140312 Final, 3rd 30-33, Generation Partnership Project (3GPP), Mobile Competence Centre; 650, Route Des 42-48 Lucioles . . . • F-06921 Sophia-Anti Poli S Cedex; France; vol. RAN WG2, No. Prague, Czech Republic; Feb. 10, 2014-Feb. 14, 2014 Feb. 9, 2014 (Feb. 9, 2014), XP050791705, Retrieved from the Internet: URL:http://www.3gpp.org/ftp/Meetings_3GPP_SYNC/RAN2/Docs/ [retrieved on Feb. 9, 2014].
Fraunhofer Hhi et al., "Enhancements for NR V2X Resource Allocation Mechanism", 3GPP Draft; R1-1808309 V2X RA, 3rd Generation Partnership-Project (3GPP), Mobile Competence Centre; 650, Route Des Lucioles ; F-06921 Sophia-Antipolis Cedex; France; vol. RAN WGl, No. Gothenburg, Sweden; Aug. 20, 2018-Aug. 24, 2018 Aug. 10, 2018 (Aug. 10, 2018), XP051515692, Retrieved from the Internet: URL:http://www.3gpp.org/ftp/tsg%5Fran/WG1%5FRL1/TSGR1%5F94/Docs/R1%2D1808309%2Ezip [retrieved on Aug. 10, 2018].
Fraunhofer Hhi et al., "Resource Pool Sharing between Mode 3 and Mode 4 UEs", 3GPP Draft; R2-1805403 MODE3MODE4RESOURCESHARING, 3rd Generation-Partnership Project (3GPP), Mobile Competence Centre; 650, Route Des Lucioles ; F-06921 Sophia-Antipolis Cedex; France, vol. RAN WG2, No. Sanya, China; Apr. 16, 2018-Apr. 20, 2018; Apr. 14, 2018 (Apr. 14, 2018), XP051429067, Retrieved from the Internet: URL:http://www.3gpp.org/ftp/Meetings%5F3GPP%5FSYNC/RAN2/Docs/ [retrieved on Apr. 14, 2018].
Ericsson, "On Procedures for In/Out of NW coverage detection for D2D", 3GPP Draft; RI-140780 Out of Coverage Procedures Final, 3rd Generation Partnership Project (3GPP), Mobile Competence Centre ; 650, Route Des Lucioles ; F-06921 Sophia-Antipolis Cedex; France; vol. RAN WG1, No. Prague, CZ; Feb. 10, 2013-Feb. 14, 2013; Jan. 31, 2014 (Jan. 31, 2014), XP050751735, Retrieved from the Internet: URL:http://www.3gpp.org/ftp/tsg_ran/WG1_RL1/TSGR1_76/Docs/ [retrieved on Jan. 31, 2014].
Nokia et al., "D2D Communication without network coverage"; 3GPP Draft; R1-134535, 3rd Generation Partnership Project (3GPP), Mobile Competence Centre; 650, Route Des Lucioles ; F-06921 Sophia-Antipolis Cedex; France, vol. RAN WG1, No. Guangzhou, China; Oct. 7, 2013-Oct. 11, 2013 Sep. 28, 2013 (Sep. 28, 2013), XP050717638, Retrieved from the Internet: URL:http://www.3gpp.org/ftp/tsg_ran/WG1_RL1/TSGR1_74b/Docs/ [retrieved on Sep. 28, 2013].
Levono et al., "Resource allocation mechanism in NR V2X", 3GPP TSG RAN WG1 Meeting #94 R1-1808556, Aug. 20-24, 2018.
AT&T, "Resource allocation mechanism", 3GPP TSG RAN WG1 Meeting #94 R1-1809069, Aug. 20-24, 2018.
NTT DOCOMO, Inc., "Resource allocation mechanism", 3GPP TSG RAN WG1 Meeting #94 R1-1809159, Aug. 10, 2018.
Rong Tu, "Office Action for CN Application No. 201980078010.8", Jan. 21, 2022, CNIPA, China.
Kyocera: "Resource allocation schemes for D2D communication", 3GPP Draft; R2-134311_D2D_ARCHITECTURE, 3rd Generation Partnership Project (3GPP), Mobile Competence Centre; 650, Route Des Lucioles ; F-06921 Sophia-Antipolis Cedex ; France, vol. RAN WG2, No. San Francisco, USA; Nov. 11, 2013-Nov. 15, 2013 Nov. 2, 2013 (Nov. 2, 2013), XP050753430.
Notice of Reasons for Rejection for KR Application No. 10-2021-7012464, Korean Intellectual Property Office, Apr. 15, 2024.
Third Office Action issued by Chinese Patent Office, Sep. 20, 2024.

\* cited by examiner

HV DCI message

DCI format Groupcast is used for the scheduling of PSCCH, and also contains several SCI format X fields used for the scheduling of PSSCH for groupcast communication.
The following information is transmitted by means of the DCI format Groupcast :
514 → Group ID
516 → Lowest index of the sub-channel allocation to the initial transmission for group - bits.
518 → Frequency resource location of initial transmission and retransmission for group.
520 → Carrier indicator - 3 bits. This field is present according to the definitons in [3].
The HV can read this DCI based on ist unique RNTI.

Fig. 12

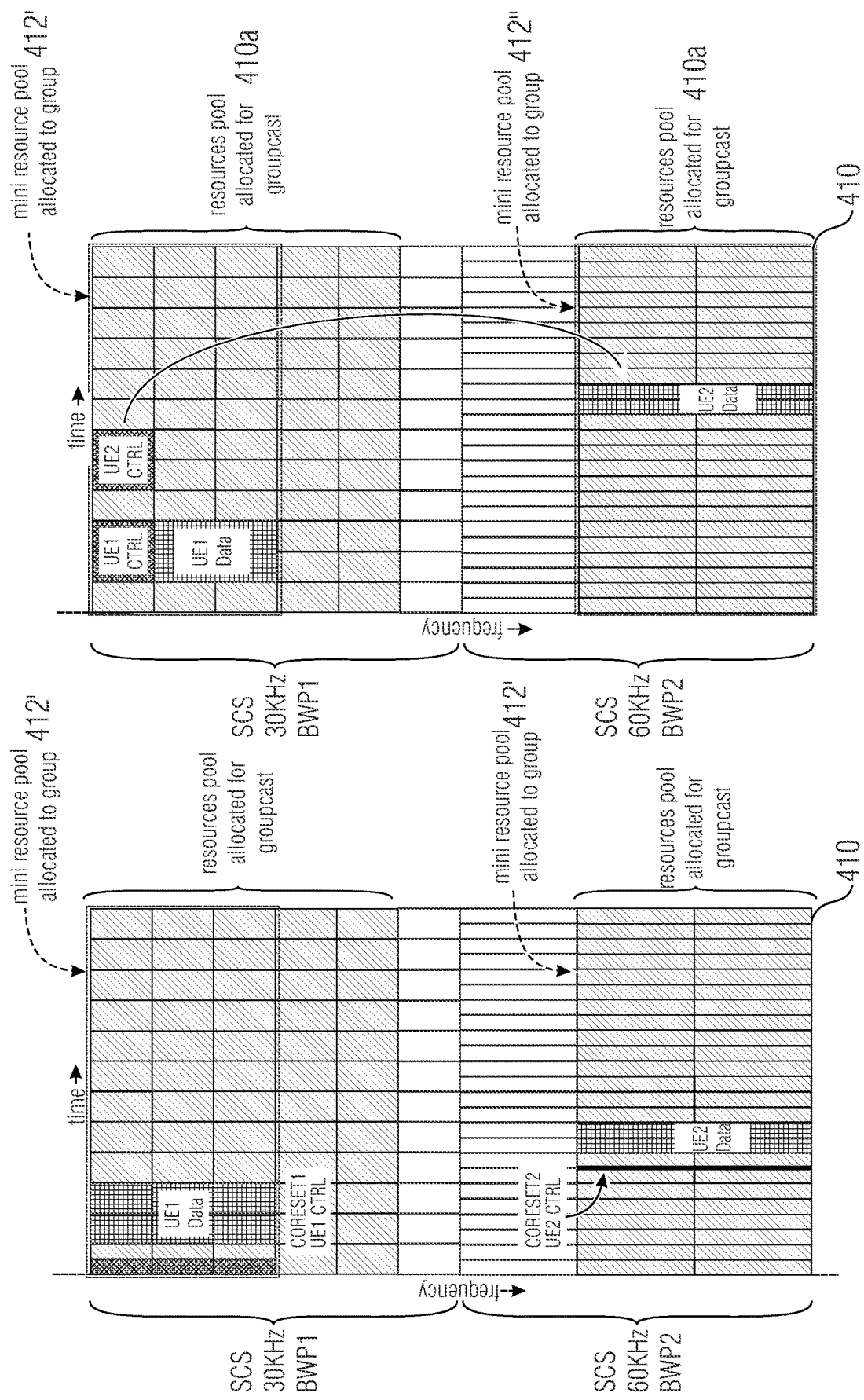

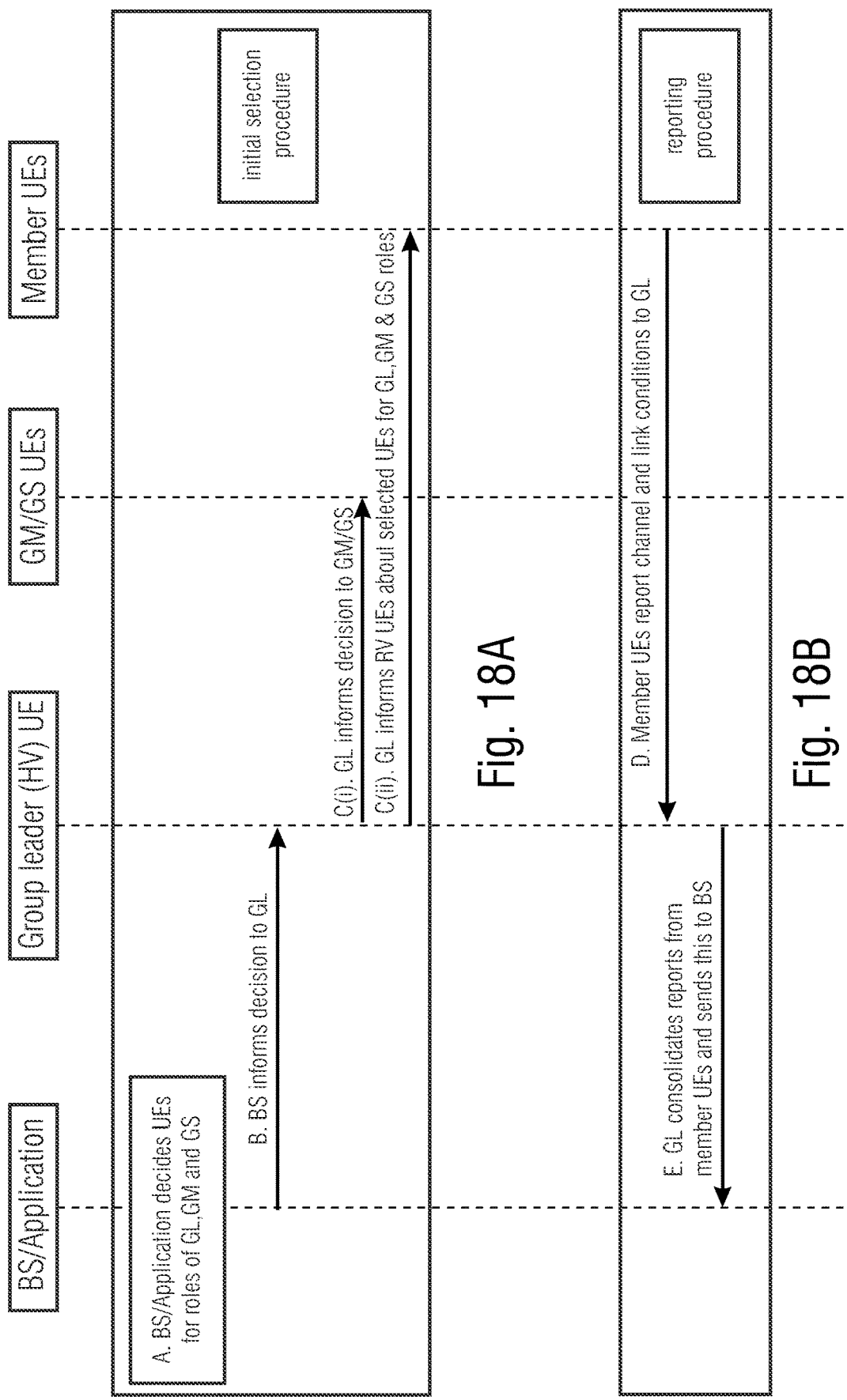

RESOURCE POOL DESIGN FOR GROUP COMMUNICATIONS

CROSS-REFERENCE TO RELATED APPLICATIONS

This application is a continuation of copending International Application No. PCT/EP2019/075357, filed Sep. 20, 2019, which is incorporated herein by reference in its entirety, and additionally claims priority from European Application No. EP 18197008.8, filed Sep. 26, 2018, which is also incorporated herein by reference in its entirety.

The present application relates to the field of wireless communication systems or networks, more specifically to approaches for a wireless communication among user devices of a wireless communication system using a sidelink communication. Embodiments concern the resource pool design for groups of user devices communicating with each other over the sidelink interface, for example for a group V2X communication.

BACKGROUND OF THE INVENTION

FIGS. 1A-1B is a schematic representation of an example of a terrestrial wireless network 100 including, as is shown in FIG. 1A a core network 102 and one or more radio access networks $RAN_1$, $RAN_2$, ... $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1B shows an exemplary view of only five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. Further, some or all of the respective base station $gNB_1$ to $gNB_5$ may be connected, e.g. via the S1 or X2 interface or XN interface in NR, with each other via respective backhaul links $116_1$ to $116_5$, which are schematically represented in FIG. 1B by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIGS. 1A-1B may by a heterogeneous network having distinct overlaid networks, e.g., a network of macro cells with each macro cell including a macro base station, like base station $gNB_1$ to $gNB_5$, and a network of small cell base stations (not shown in FIGS. 1A-1B), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIGS. 1A-1B, for example in accordance with the LTE-Advanced Pro standard or the 5G or NR, new radio, standard.

In mobile communication networks, for example in a network like that described above with reference to FIGS. 1A-1B, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIGS. 1A-1B. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIGS. 1A-1B, rather, it means that these UEs are not connected to a base station, for example, they are not in an RRC connected state. Yet another scenario is called a "partial coverage" scenario, in accordance with which one of the two UEs which communicate with each other over the sidelink, is served by a base station, while the other UE is not served by the base station.

When considering two UEs directly communicating with each other over the sidelink, e.g. PC5, one of the UEs can also be connected with a BS, and can relay information from the BS to the other UE via the sidelink interface. The relaying can be performed in the same frequency band (in-band-relay) or using another frequency band (out-of-band relay). In the first case, communication on the Uu and on the sidelink can be decoupled using different time slots as in time division duplex (TDD) systems.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIGS. 1A-1B. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 1 configuration in NR V2X or as a mode 3 configuration in LTE V2X.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 2, in addition to the mode 3 UEs 202, 204 also mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. Within the wireless communication network or within a cell thereof, a plurality of such groups may exist at the same time. While it is noted that the communication within the group is via sidelink communication, in case the group or at least some group members thereof are in-coverage, this does not exclude that also some or all of the group members communicate with other entities outside the group via the base station or via the sidelink. For example, the above-described scenarios using vehicular user devices may be employed in the field of the transport industry in which a plurality of vehicles being equipped with vehicular user devices may be grouped together, for example, by a remote driving application.

Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

It is noted that the information in the above section is only for enhancing the understanding of the background of the invention and therefore it may contain information that does not form conventional technology that is already known to a person of ordinary skill in the art.

SUMMARY

An embodiment may have an apparatus for a wireless communication system, the wireless communication system including a plurality of base stations and a plurality of user devices, UEs, wherein the apparatus is configured to be connected to a base station for a communication with the base station, and one or more UEs via a sidelink for a sidelink communication with the one or more UEs, the apparatus and the one or more UEs forming a group of user devices, and the apparatus is configured to request from a base station, directly or indirectly, resources to be used for the sidelink communication with the one or more UEs of the group of user devices, and obtain from the base station, directly or indirectly, information about at least one set of resources to be used for the sidelink communication within the group, each of the sets of resources being only or exclusively used within the group of user devices, the group members including the apparatus and the one or more UEs of the group.

According to another embodiment, a group of user devices, UEs, in a wireless communication system, the wireless communication system including a plurality of base stations and a plurality of user devices, may have: one or more first apparatus, and one or more second apparatus, wherein the one or more first apparatus include at least one group leader, GL UE, wherein the GL UE is configured to be connected to a base station for a communication with the base station, be connected to one or more UEs via a sidelink for a sidelink communication with the one or more UEs, the apparatus and the one or more UEs forming a group of user devices, and request from a base station, directly or indirectly, resources to be used for the sidelink communication with the one or more UEs of the group of user devices, obtain from the base station, directly or indirectly, information about at least one set of resources to be used for the sidelink communication within the group, each of the sets of resources being only or exclusively used within the group of user devices, the group members including the apparatus and the one or more UEs of the group, obtain directly from the base station the information about the set of resources to be used for transmissions within the group of user devices, inform the one or more UEs of the group of user devices about the set of resources to be used for transmissions within the group of user devices, and for a communication within the group, only the apparatus is configured to request from the base station the set of resources, and the one or more UEs of the group do not request any resources from the base station but communicate within the group using only the resources within the set of resources, and wherein the one or more second apparatus include one or more remote UEs, wherein the remote UE is configured to be connected to a base station for a communication with the base station, be connected to one or more UEs via a sidelink for a sidelink communication with the one or more UEs, the apparatus and the one or more UEs forming a group of user devices, request from a base station, directly or indirectly, resources to be used for the sidelink communication with the one or more UEs of the group of user devices, obtain from the base station, directly or indirectly, information about at least one set of resources to be used for the sidelink communication within the group, each of the sets of resources being only or exclusively used within the group of user devices, the group members including the apparatus and the one or more UEs of the group, in case of obtaining the information about the set of resources from the base station indirectly, the remote UE is configured to obtain the information about the set of resources from the GL UE, and wherein the first and second apparatus form a group of user devices.

Another embodiment may have a base station for a wireless communication system, wherein the base station is configured to communicate with one or more of a plurality of user devices, UEs, the base station configured to provide a number of resources to be allocated for transmissions within one or more groups of user devices, the one or more groups of user devices including as group members one or more apparatus, the apparatus configured to be connected to a base station for a communication with the base station, be connected to one or more UEs via a sidelink for a sidelink communication with the one or more UEs, the apparatus and the one or more UEs forming a group of user devices, request from a base station, directly or indirectly, resources to be used for the sidelink communication with the one or more UEs of the group of user devices, and obtain from the base station, directly or indirectly, information about at least one set of resources to be used for the sidelink communication within the group, each of the sets of resources being only or exclusively used within the group of user devices, the group members including the apparatus and the one or more UEs of the group, and the base station is configured to receive from one or more group members, a request for resources to be used for transmissions within the group of user devices, and provide to one or more group members a set of resources belonging to the first number of resources to be used for transmissions within the group of user devices, the set of resources being only or exclusively used within the group of user devices to which the one or more group members belong.

According to another embodiment, a wireless communication network may have: one or more apparatus the apparatus is configured to be connected to a base station for a communication with the base station, be connected to one or more UEs via a sidelink for a sidelink communication with the one or more UEs, the apparatus and the one or more UEs forming a group of user devices, request from a base station, directly or indirectly, resources to be used for the sidelink communication with the one or more UEs of the group of user devices, and obtain from the base station, directly or indirectly, information about at least one set of resources to be used for the sidelink communication within the group, each of the sets of resources being only or exclusively used within the group of user devices, the group members including the apparatus and the one or more UEs of the group, and one or more base stations, wherein the base station is configured to communicate with one or more of a plurality of user devices, UEs, the base station configured to provide a number of resources to be allocated for transmissions within one or more groups of user devices, wherein the base station is configured to receive from one or more group members, a request for resources to be used for transmissions within the group of user devices, and provide to one or more group members a set of resources belonging to the first number of resources to be used for transmissions within the group of user devices, the set of resources being only or exclusively used within the group of user devices to which the one or more group members belong, wherein the one or more groups of user devices includes a group of inventive user devices.

According to another embodiment, a method for operating an apparatus of a wireless communication system having a plurality of base stations and a plurality of user devices, UEs, the apparatus connected to a base station for a communication with the base station, and to one or more UEs via a sidelink for a sidelink communication with the one or more UEs, the apparatus and the one or more UEs forming a group of user devices, may have the steps of: requesting from a base station, directly or indirectly, resources to be used for the sidelink communication with the one or more UEs of the group of user devices, and obtaining from the base station, directly or indirectly, information about at least one set of resources to be used for the sidelink communication within the group, each of the sets of resources being only or exclusively used within the group of user devices, the group members including the apparatus and the one or more UEs of the group.

Another embodiment may have a non-transitory digital storage medium having a computer program stored thereon to perform the method for operating an apparatus of a wireless communication system having a plurality of base stations and a plurality of user devices, UEs, the apparatus connected to a base station for a communication with the base station, and to one or more UEs via a sidelink for a sidelink communication with the one or more UEs, the apparatus and the one or more UEs forming a group of user devices, the method having the steps of: requesting from a base station, directly or indirectly, resources to be used for the sidelink communication with the one or more UEs of the group of user devices, and obtaining from the base station, directly or indirectly, information about at least one set of resources to be used for the sidelink communication within the group, each of the sets of resources being only or exclusively used within the group of user devices, the group members including the apparatus and the one or more UEs of the group, when said computer program is run by a computer.

BRIEF DESCRIPTION OF THE DRAWINGS

Embodiments of the present invention will be detailed subsequently referring to the appended drawings, in which:

FIG. 12 illustrates a DCI message received at a leader UE at step 4 in FIG. 10 from a base station;

FIGS. 14A, 14B illustrate embodiments of resource pools within a bandwidth part;

FIGS. 18A, 18B, 18C illustrate an embodiment of a message flow for the selection of GL, GM and GS UEs when the group is in-coverage;

DETAILED DESCRIPTION OF THE INVENTION

Figure 1A:
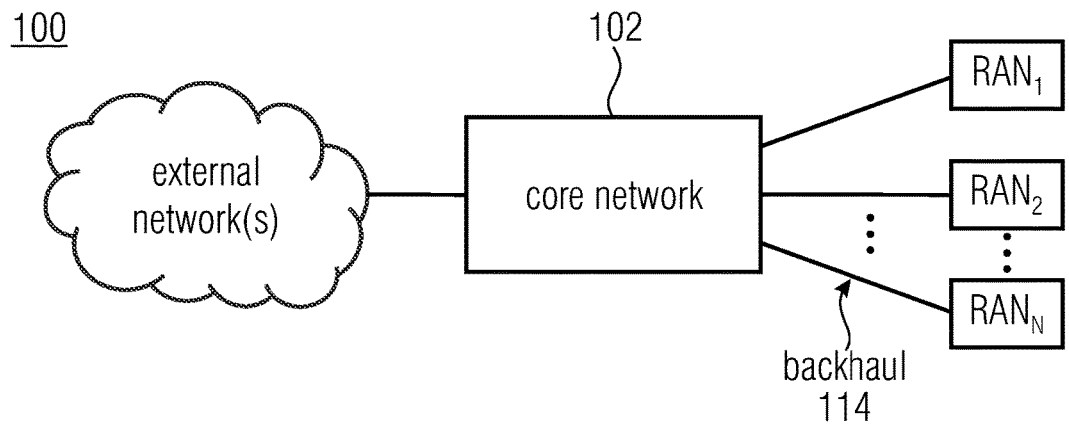
FIGS. 1A, 1B show a schematic representation of an example of a wireless communication system.

Embodiments of the present invention is now described in more detail with reference to the accompanying drawings in which the same or similar elements have the same reference signs assigned.

The initial vehicle-to-everything (V2X) specification was included in LTE Release 14 of the 3GPP standard. The scheduling and assignment of resources had been modified according to the V2X requirements, while the original device-to-device (D2D) communication standard has been used as a basis of the design. Cellular V2X has been agreed to operate in two configurations from a resource allocation perspective, namely in the above-described mode 3 and mode 4 configurations. As mentioned above, in the V2X mode 3 configuration the scheduling and interference management of resources is performed by the base station for UEs within the coverage of the base station so as to enable sidelink, SL, communications, like vehicle-to-vehicle communications. The control signaling is provided to the UE over the Uu interface, for example using the downlink control indicator, DCI, and is dynamically assigned by the base station. In the V2X mode 4 configuration the scheduling and interference management for SL communications is autonomously performed using distributed or decentralized algorithms among the UEs based on a preconfigured resource configuration. As is described above, there are different scenarios or use cases in which a communication among the group members is desired, which is also referred to as a groupcast communication. Such groupcast communications entail that the members of the group are able to communicate with each other over shorter distances, while maintaining a high level of reliability and low latency.

Examples of the mentioned use cases are vehicle platooning, extended sensors, advanced driving and remote driving. So far, the base station allocates the resources to be used for a communication with the base station to a UE, and the resources are selected by the base station from the overall set of resources or from a subset of resources available at the base station which may be allocated by the base station to the plurality of users which are within the coverage of the base station. However, this approach is disadvantageous, because this may result in a large signaling overhead for the request of sidelink (SL) transmission resources for UEs within a group and/or lead to a degraded communication performance when the group competes for resources with other UEs not part of the group. Furthermore, for sidelink communication, continuous processing of a very large system bandwidth is a challenge. The bandwidth part (BWP) concept in NR supports a larger system bandwidth in frequency domain when compared to previous cellular standards, e.g. LTE or UMTS. The maximum bandwidth for a single Component Carrier (CC) in NR, depending on the configured numerology, can be up to 50 MHz (@ 15 kHz), 100 MHz (@ 30 kHz), 200 MHz (@ 60 kHz), 400 MHz (@120 kHz). Note for LTE, the maximum supported bandwidth per CC is 20 MHz. In addition, the system bandwidth in NR can be increased further by carrier aggregation (CA) techniques, similar to LTE CA.

For V2X in NR utilizing a large bandwidth without further refinement, V2X UEs have to search for control and data signals over a much larger bandwidth as in previous systems. This needs buffering and processing of more data in a given time period. Consequently, V2X UEs have to support a larger memory, when compared to LTE V2X modems, as well as higher processing capabilities. Furthermore, current V2X UEs are mostly half-duplex modems. This means that V2X UEs cannot transmit and receive at the same time. Switching between receive and transmit direction will take valuable time resources. Thus, any optimization of control signaling and resource allocation for V2X UEs can prevent V2X UEs from switching at a time instant where a given V2X UE should use its receive branch for scanning and receiving of V2X messages.

To address this issue, the present invention provides an approach which no longer more or less arbitrarily selects for a UE the resources to be used from the resources available at the base station, also referred to as a resource pool of the base station. Rather, in accordance with the inventive approach, for each of the groups within the coverage of the base station one or more predefined sets of resources are selected or reserved, which are also referred to as a mini resource pool (mini-RP or mRP) or a sub-pool. This set of resources or mini resource pool is exclusively within the group of user devices for a communication among the group members using the SL interface. In other words, other than in conventional approaches, in accordance with the inventive approach, for each group of user devices, one or more mini resource pools are defined within the overall resource pool of the base station, and for a communication among the respective group members within a group, resources from the one or more mini resource pools associated with the group are allocated by the base station to the respective group member, either directly or indirectly via another member UE. The inventive approach is advantageous over conventional approaches because dedicated resources are assigned for group communications, which enables lower latency and higher reliability communications for UEs within a group. Furthermore utilizing the inventive approach, the V2X UE only has to scan, buffer, and process its portion of the bandwidth part (BWP) having a smaller bandwidth than the original BWP. This reduces the amount of memory and processing power needed for a V2X UE and may reduce the switching time when switching between transmitting and receiving. Furthermore, since the complexity of the V2X UEs is reduced, this can reduce the price of V2X UE modems with this feature set.

Figure 1B:
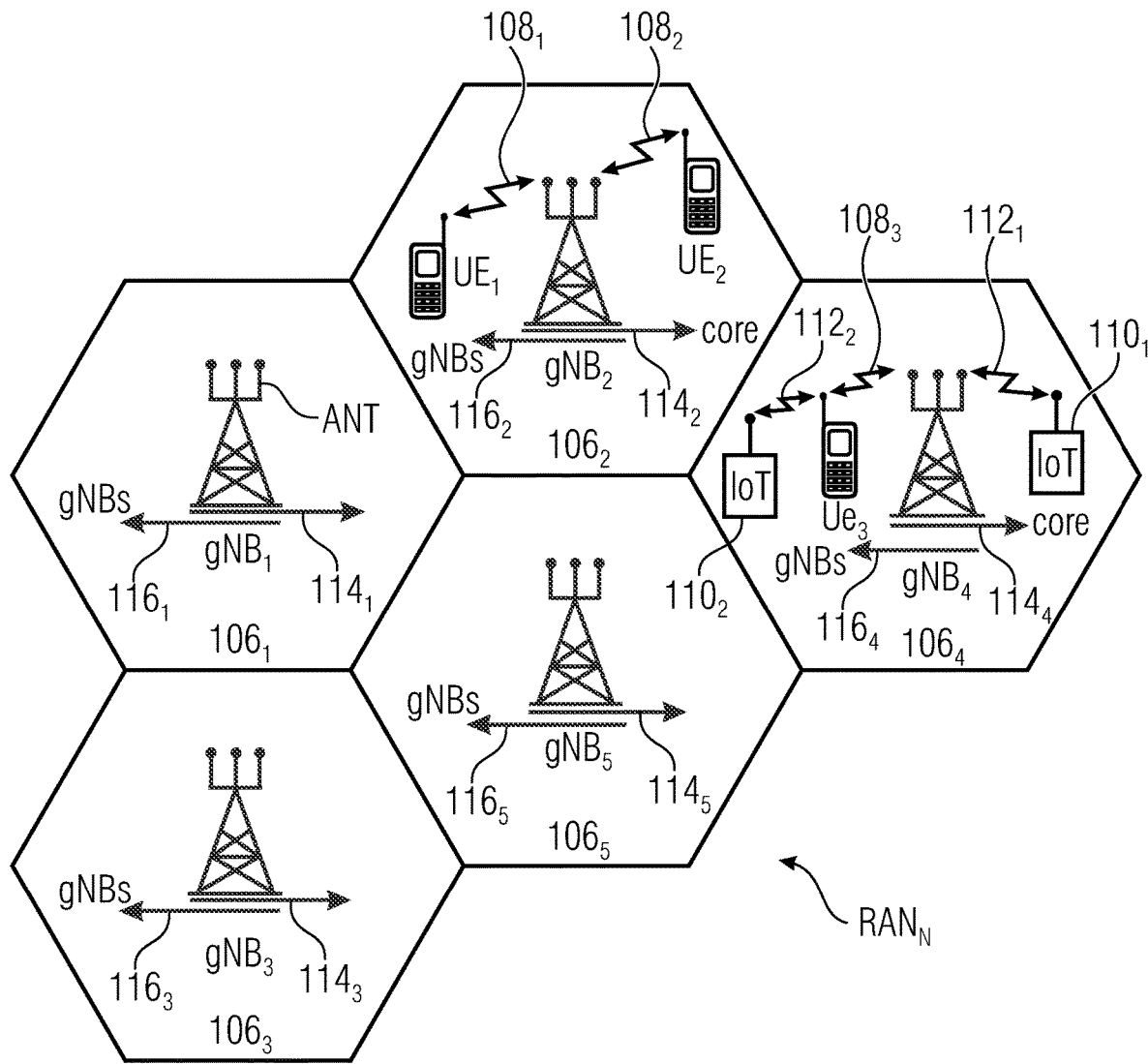
Figure 2:
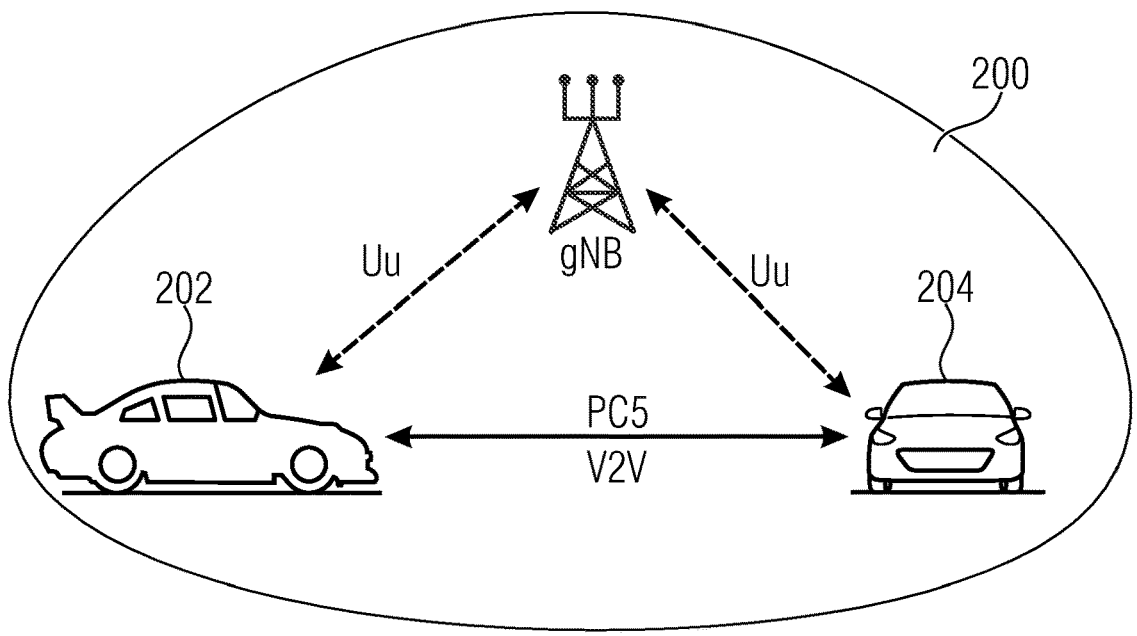
FIG. 2 shows a schematic representation of a situation in which UEs directly communicating with each other are in coverage of a base station.
Figure 3:
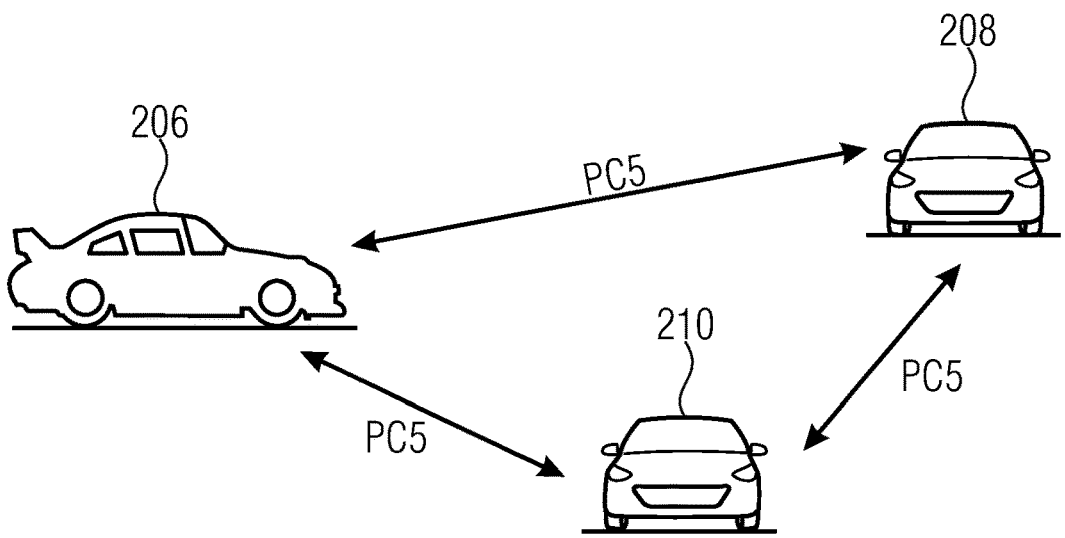
FIG. 3 shows a scenario in which UEs directly communicating with each other are not are not in coverage of a base station, i.e., are not connected to a base station.
Figure 4:
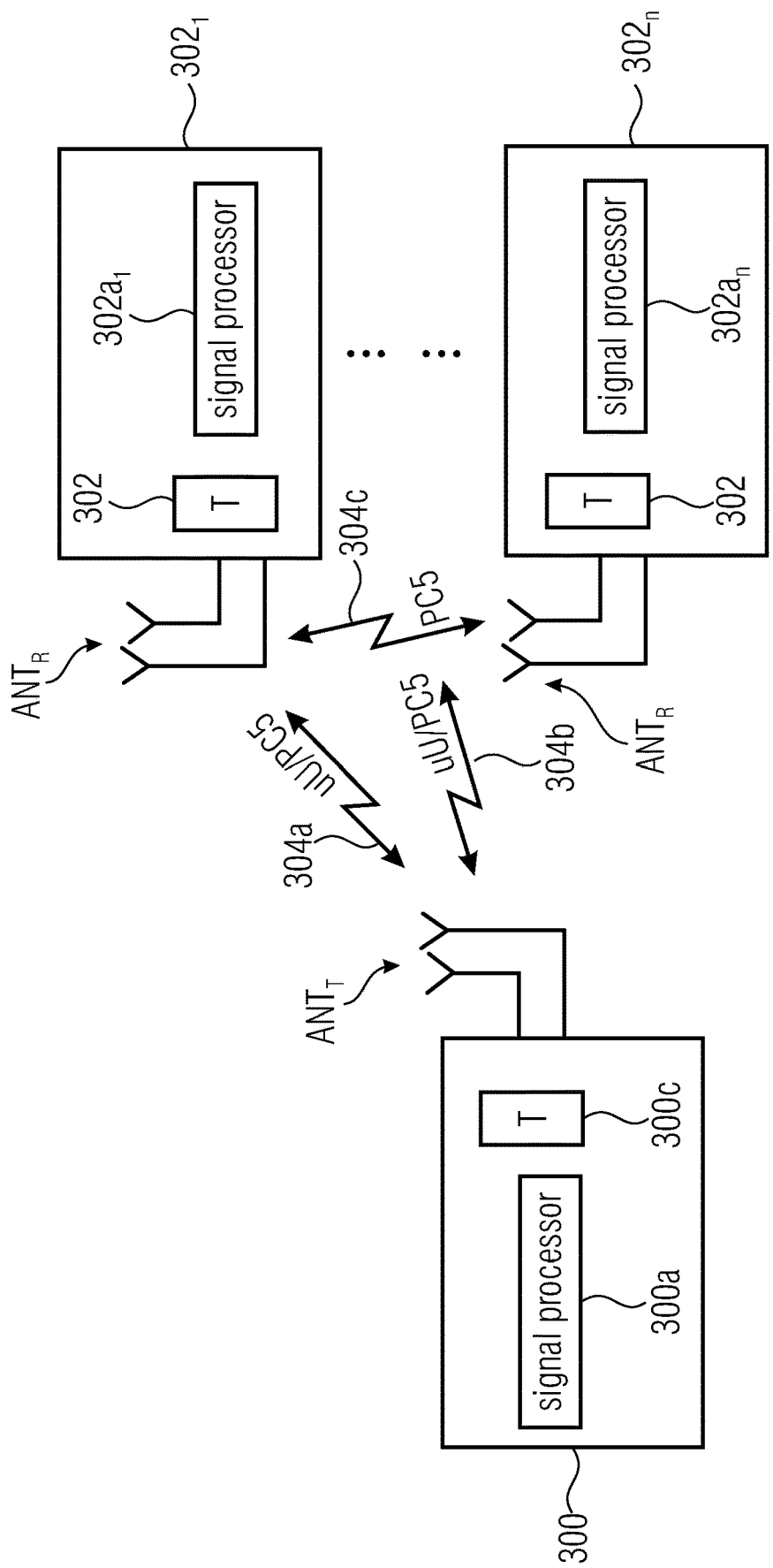
FIG. 4 is a schematic representation of a wireless communication system for communicating information between a transmitter and one or more receivers in accordance with embodiments of the present invention.

Stated differently, the present invention aims at providing an improved approach for providing or defining the involved resources for the communication within groups of UEs. This is addressed by the present invention as described hereinbelow in more detail, and embodiments of the present invention may be implemented in a wireless communication system as depicted in FIG. 1, FIG. 2 and FIG. 3 including base stations and users, like mobile terminals or IoT devices. FIG. 4 is a schematic representation of a wireless communication system including a transmitter 300, like a base station, and one or more receivers $302_1$ to $302_n$, like user devices, UEs. The transmitter 300 and the receivers 302 may communicate via a wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface.

The system, the base station 300 and the one or more UEs 302 may operate in accordance with the inventive teachings described herein.

The present invention provides (see for example claim 1) an apparatus for a wireless communication system, the wireless communication system including a plurality of base stations and a plurality of user devices, UEs, wherein
 the apparatus is configured to be connected to
  a base station for a communication with the base station, and
  one or more UEs via a sidelink for a sidelink communication with the one or more UEs, the apparatus and the one or more UEs forming a group of user devices, and
 the apparatus is configured to
  request from a base station, directly or indirectly, resources to be used for the sidelink communication with the one or more UEs of the group of user devices, and
  obtain from the base station, directly or indirectly, information about at least one set of resources to be used for the sidelink communication within the group, each of the sets of resources being only or exclusively used within the group of user devices, the group members including the apparatus and the one or more UEs of the group.

In accordance with embodiments (see for example claim 2), the set of resources provided by the base station include plurality of groups of resources, the plurality of groups of resources including at least a first group of resources having a first numerology and a second group of resources having a second numerology, the first and second numerologies being different.

In accordance with embodiments (see for example claim 3), dependent on QoS requirements, e.g., QoS requirements of an application layer defining certain priority and/or latency and/or reliability requirements, the set of resources is selected from the first group of resources or from the second group of resources.

In accordance with embodiments (see for example claim 4), the apparatus is configured to
 send to the base station, directly or indirectly, its QoS requirements,
 receive from the base station, directly or indirectly, a confirmation that the base station allocates resources belonging to needed numerology, and
 responsive to the confirmation, provide the base station, directly or indirectly, with an estimated data usage so as to allow the base station to allocate the resources for the apparatus.

In accordance with embodiments (see for example claim 5), the set of resources provided by the base station includes one or more group of resources having different numerologies, the one or more group of resources being configured to be only used for the group.

In accordance with embodiments (see for example claim 6), the resources available at the base station include one or more groups of resources having different numerologies, the set of resources provided by the base station, which are configured to be only used for the group, belonging to the one or more group of resources.

In accordance with embodiments (see for example claim 7), each group of resources contains a control region for sidelink control information, SCI, pointing to resources in the groups of resources where data is present.

In accordance with embodiments (see for example claim 8), a plurality of groups of resources is provided, the plurality of groups of resources including
one or more groups of resources containing a control region for sidelink control information, SCI, pointing to resources in a group of resources where data is present, and
one or more groups of resources containing no control region.

In accordance with embodiments (see for example claim 9),
a control region comprises one or more of
a Common Search Space,
a User-Specific Search Space,
a Group-Specific Search Space,
a Control Resource Set, CORESET,
a search space is a certain area in a resource grid defined by the set of resources where the sidelink control information, like the Physical SL Control Channel, PSCCH, is present, and
the one or more groups of resources may be bandwidth parts, BWPs.

In accordance with embodiments (see for example claim 10), the apparatus is configured to
in case resources from the set of resources are allocated to the apparatus, select for a transmission among group members the allocated resources from the set of resources, or
in case resources from the set of resources are not allocated to the apparatus, scan and sense the set of resources for resources with a lower probability of collision so as to select for a transmission among group members resources with a lower probability of collision, or
in case resources from the set of resources are not allocated to the apparatus, randomly select for a transmission among group members resources from the set of resources, or
in case only a part of the resources from the set of resources is allocated to the apparatus, responsive to a signaling allowing the apparatus to use one or more of the remaining free or unused resources,
scan and sense the remaining free or unused resources for resources with a lower probability of collision so as to select for a transmission among group members remaining free or unused resources with a lower probability of collision, or randomly select for a transmission among group members resources from the remaining free or unused resources, and
signal those resources from remaining free or unused resources which are used by the apparatus,
wherein, optionally, the apparatus may configured to be instructed by another group member, like a group leader, to do sensing and to send the sensing results to the other group member.

In accordance with embodiments (see for example claim 11), resources from the set of resources are allocated using a precise resource assignment indicating a time/frequency grid to be used, and/or using a listen-before-talk, LBT, within the set of resources.

In accordance with embodiments (see for example claim 12), to request from the base station the resources to be used for sidelink communication with the one or more UEs of the group of user devices, the apparatus is configured to
determine an amount of resources needed for the sidelink communication within the group of user devices, and
request the determined amount of resources from the base station.

In accordance with embodiments (see for example claim 13), the apparatus is configured to inform the base station about the utilization of the allocated resources from the set of resources, either responsive to a query from the base station or at predefined intervals.

In accordance with embodiments (see for example claim 14), the apparatus is configured to determine the amount of resources needed based on one or more of the following parameters or based on a combination of one or more of the following parameters:
a size of the group,
a desired numerology of the resources,
an amount of data needed to perform critical groupcast specific communications,
a needed latency, e.g., in the form of a Pro-se Per Packet Priority, PPPP, or a Packet delay Budget, PDB,
a needed reliability, e.g., in the form of a Pro-se Per Packet Reliability, PPPR, or a Packet Error Rate,
a communication range,
a quality of service, QoS, class identifier, QCI,
a 5G QoS indicator, 5QI, metrics.

In accordance with embodiments (see for example claim 15), the set of resources belongs to a first number of resources provided by the base station for exclusive use by one or more groups of user devices.

In accordance with embodiments (see for example claim 16),
the base station further providing at least a second number of resources to be allocated for transmissions to individual UEs or to all UEs being in coverage with the base station, and
the set of resources further includes, in addition to the resources belonging to the first number of resources, additional resources belonging to the second number of resources so as to allow the transmission of a broadcast message, like a BSM, by a member of the group.

In accordance with embodiments (see for example claim 17),
wherein the first number of resources and the second number of resources partially overlap so as to define common resources from which the additional resources are selected, or
wherein the first number of resources and the second number of resources are separate from each other, and the additional resources are selected from the second number of resources.

In accordance with embodiments (see for example claim 18), in case the apparatus leaves a coverage area of the base station, the apparatus is configured to
retain a current resource configuration, or
retain a current resource configuration until a timer expires, or
retain a current resource configuration until an event is triggered, or
use a predefined resource configuration provided by the base station, or use a resource configuration which is hard-coded in the apparatus.

In accordance with embodiments (see for example claim 19), the set of resources comprises a plurality of contiguous or non-contiguous resources across a frequency domain and adjacent or non-adjacent across a time domain.

In accordance with embodiments (see for example claim 20), the set of resources defines a resource pool or mini resource pool or a sub-pool.

In accordance with embodiments (see for example claim 21), the apparatus comprises one or more of
a mobile terminal, or
stationary terminal, or
cellular IoT-UE, or
vehicular UE, or
an IoT or narrowband IoT, NB-IoT, device, or
a ground based vehicle, or
an aerial vehicle, or
a drone, or
a moving base station, or
road side unit, or
a building, or
any other item or device provided with network connectivity enabling the item/device to communicate using the wireless communication network, e.g., a sensor or actuator.

In accordance with embodiments (see for example claim 22), the apparatus is configured to
obtain directly from the base station the information about the set of resources to be used for transmissions within the group of user devices, and
inform the one or more UEs of the group of user devices about the set of resources to be used for transmissions within the group of user devices.

In accordance with embodiments (see for example claim 23), for a communication within the group, only the apparatus is configured to request from the base station the set of resources, and the one or more UEs of the group do not request any resources from the base station but communicate within the group using only the resources within the set of resources.

In accordance with embodiments (see for example claim 24), wherein, to inform the one or more UEs of the group of user devices about the set of resources to be used for transmissions within the group of user devices, the apparatus is configured to
transmit information about the set of resources using a configuration control message, the configuration control message including at least a group ID and time and frequency parameters defining the set of resources.

In accordance with embodiments (see for example claim 25), the configuration control message indicates one or more of:
first resources for a transmission by the apparatus so that the first resources are visible to the one or more UEs of the group so that to the one or more UEs of the group do not transmit using the first resources,
a sidelink semi-persistent scheduling, SL SPS, configuration index for the one or more UEs of the group based on QoS parameters, like priority, reliability, latency,
an activation/release of SL SPS,
a retransmission indication,
shared resource indices for broadcast Basic Safety Messages, BSM,
high priority resource indices, like time and frequency resources to be used by any of the UEs at the time of an emergency.

In accordance with embodiments (see for example claim 26), the one or more UEs of the group, responsive to the configuration control message, listens only to a control channel in the set of resources, and not to control channels in an entire set of resources provided by the base station for exclusive use by one or more groups of user devices.

In accordance with embodiments (see for example claim 27), the apparatus is configured to reserve in the set of resources first resources for a transmission by itself, and to allocate the remaining resources from the set of resources to the one or more UEs of the group so that other UEs listen/receive transmission on the first resources.

In accordance with embodiments (see for example claim 28), in case of obtaining the information about the set of resources from the base station indirectly, the apparatus is configured to obtain the information about the set of resources from a group leader UE, wherein the group leader UE is or includes the inventive apparatus.

In accordance with embodiments (see for example claim 29), responsive to a request from the group leader UE, the apparatus is configured to transmit one or more transmission parameters to the group leader UE, wherein the one or more transmission parameters may include on one or more of or a combination of one or more of the following parameters:
a desired numerology of the set of resources,
an amount of data needed to perform critical groupcast specific communications,
a needed latency, e.g., in the form of a Pro-se Per Packet Priority, PPPP, or a Packet delay Budget, PDB,
a needed reliability, e.g., in the form of a Pro-se Per Packet Reliability, PPPR, or a Packet Error Rate,
a communication range,
a quality of service, QoS, class identifier, QCT,
a 5G QoS indicator, 5QI, metrics.

In accordance with embodiments (see for example claim 30), the apparatus is configured to receive a transmission from the group leader UE about the set of resources, the transmission including a configuration control message, the configuration control message including at least a group ID and time and frequency parameters defining the set of resources.

In accordance with embodiments (see for example claim 31), responsive to the configuration control message, the apparatus is configured to listen only to a control channel in the set of resources, and not to control channels in an entire set of resources provided by the base station for exclusive use by one or more groups of user devices.

In accordance with embodiments (see for example claim 32), the apparatus is configured to not request the base station for resources for a transmission among group members but to select resources for a transmission among group members from within the set of resources.

The present invention provides (see for example claim 33), a group of user devices, UEs, in a wireless communication system, the wireless communication system including a plurality of base stations and a plurality of user devices, comprising a plurality of the inventive apparatuses, wherein the one or more first apparatus include at least one group leader, GL UE, and the one or more second apparatus include one or more remote UEs, the first and second apparatus forming the group of user devices.

In accordance with embodiments (see for example claim 34), the group extends starting from a first group member in a group extension direction, and further group members are positioned along the group extension direction, and wherein the GL UE is positioned at a certain position in the group, e.g. at the beginning of the group or at a center of the group.

In accordance with embodiments (see for example claim 35), the plurality for second apparatus include
  at least one Group Marshall, GM, UE positioned within the group so as act as a relay, and/or
  at least one Group Sweeper, GS, UE positioned at an end of the group to cater to resource allocation issues when transitioning across zones and coverage areas of base stations.

In accordance with embodiments (see for example claim 36),
  the GL, GM and GS UEs are initially decided by the base station or by an application during the formation of the group of UEs,
  in case the group is in coverage, dependent on channel and link conditions the base station decides whether the GL, GM and GS UEs are changed or maintained, and
  in case the group is out of coverage, dependent on channel and link conditions the current GL UE decides whether the GL, GM and GS UEs are changed or maintained.

In accordance with embodiments (see for example claim 37), the UEs are vehicular UEs, and wherein the group is a platoon of vehicles, or wherein the UEs are machines on a factory floor.

The present invention provides (see for example claim 38), a base station for a wireless communication system, wherein
  the base station is configured to communicate with one or more of a plurality of user devices, UEs, the base station configured to provide a number of resources to be allocated for transmissions within one or more groups of user devices, the one or more groups of user devices including one or more of the inventive apparatuses as group members, and
  the base station is configured to
    receive from one or more group members, a request for resources to be used for transmissions within the group of user devices, and
    provide to one or more group members a set of resources belonging to the first number of resources to be used for transmissions within the group of user devices, the set of resources being only or exclusively used within the group of user devices to which the one or more group members belong.

In accordance with embodiments (see for example claim 39), in case a number of resources requested by a group member over a given time period reaches or exceeds a threshold, the base station is configured to grant only a subset of the requested resources.

In accordance with embodiments (see for example claim 40), the base station is configured to query a group member about the utilization of resources belonging to the set of resources, or to receive information from a group member about the utilization of resources belonging to the set of resources at predefined time intervals.

In accordance with embodiments (see for example claim 41), in case a group is dismantled, the base station is configured to release the set of resources associated or reserved for the dismantled group so as to allow using the set of resources for one or more other groups.

In accordance with embodiments (see for example claim 42), the base station comprises one or more of
  a macro cell base station, or
  a small cell base station, or
  a central unit of a base station, or
  a distributed unit of a base station, or
  a road side unit, or
  a UE, or
  a remote radio head, or
  an AMF, or
  an SMF, or
  a core network entity, or
  mobile edge computing entity, or
  a network slice as in the NR or 5G core context, or
  any transmission/reception point, TRP, enabling an item or a device to communicate using the wireless communication network, the item or device being provided with network connectivity to communicate using the wireless communication network.

System

The present invention provides a wireless communication network, comprising at least one of the inventive UEs and at least one of the inventive base stations.

Methods

The present invention provides (see for example claim 44) a method for operating an apparatus of a wireless communication system having a plurality of base stations and a plurality of user devices, UEs, the apparatus connected to a base station for a communication with the base station, and to one or more UEs via a sidelink for a sidelink communication with the one or more UEs, the apparatus and the one or more UEs forming a group of user devices, the method comprising:
  requesting from a base station, directly or indirectly, resources to be used for the sidelink communication with the one or more UEs of the group of user devices, and
  obtaining from the base station, directly or indirectly, information about at least one set of resources to be used for the sidelink communication within the group, each of the sets of resources being only or exclusively used within the group of user devices, the group members including the apparatus and the one or more UEs of the group.

In accordance with embodiments (see for example claim 45), the information about the set of resources to be used for transmissions within the group of user devices are obtained by the apparatus directly from the base station, the method comprising informing, by the apparatus, the one or more UEs of the group of user devices about the set of resources to be used for transmissions within the group of user devices.

In accordance with embodiments (see for example claim 46), the information about the set of resources to be used for transmissions within the group of user devices are obtained by the apparatus indirectly from the base station, the method comprising obtaining, by the apparatus, the information about the set of resources from a group leader UE.

The present invention provides (see for example claim 47) a method for operating a base station for a wireless communication system, the method comprising:
  communicating, by the base station, with one or more of a plurality of user devices, UEs, the base station configured to provide a number of resources to be allocated for transmissions within one or more groups of user devices,
  receiving from one or more group members, a request for resources to be used for transmissions within the group of user devices, and
  providing to one or more group members a set of resources belonging to the first number of resources to be used for transmissions within the group of user devices, the set of resources being only or exclusively used within the group of user devices to which the one or more group members belong.

Computer Program Product

The present invention provides a computer program product comprising instructions which, when the program is executed by a computer, causes the computer to carry out one or more methods in accordance with the present invention.

Figure 5:
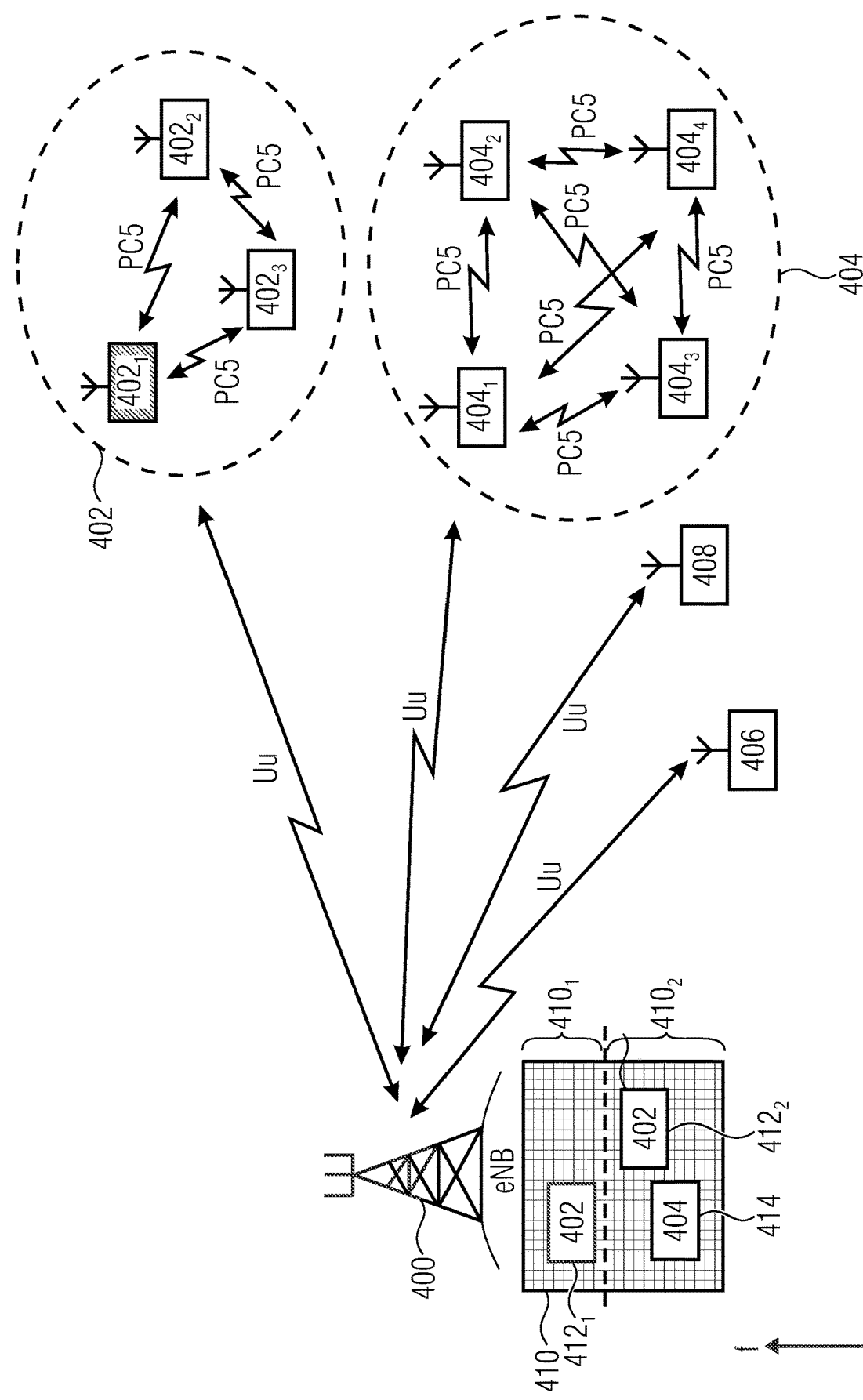
FIG. 5 is a schematic representation of a part of the wireless communication network, like the one of FIGS. 1A-1B, for implementing embodiments of the inventive approach.

FIG. 5 is a schematic representation of a part of the wireless communication network, like the one described with reference to FIG. 1, for implementing the inventive approach. More specifically, FIG. 5 illustrates a cell of the network mentioned above or one of a plurality of radio access networks available in such a wireless communication network. FIG. 5 illustrates the base station 400 and a plurality of user devices, UEs, which are within the coverage of the base station 400. Some of the UEs within the coverage of the base station 400 are grouped into respective user device groups 402 and 404, while other UEs, like UEs 406 and 408 are not members of any group. The first group 402 includes, in accordance with the depicted example, three UEs $401_1$ to $402_3$, and within the group 402, the UEs $401_1$ to $402_3$ may communicate with each other using a sidelink interface, like the PC5 interface. The group 404 includes four UEs $404_1$ to $404_4$ which, like the UEs in the first group 402 communicate among each other using the sidelink communications via the sidelink interface, like the PC5 interface. The UEs 402 to 408 may further communicate directly with the base station 400 using, for example, the Uu interface. Within the respective groups 402, 404, one of the UEs, some of the UEs or all of the UEs may communicate directly with the base station 400, however, for a communication with a group member a sidelink communication is employed.

For the communication within the coverage of the base station 400, a resource pool 410 is provided from which resources may be allocated to the respective UEs 402 to 408 for transmitting data. For example, the resources or resource pool 410 available at the base station 400 includes a time/frequency/space resource grid, and in accordance with the present invention, for each of the groups 402, 404 the base station 400 determines at least one set of resources, from the resources 410, also referred to as a group resource pool, a resource pool, a mini resource pool or a sub-pool, from which resources are selected by the base station 400 for allocation to the respective groups 402, 404 for a communication among the group members over the sidelink interface. In the example of FIG. 5, the base station 400 provides for the first group 402 two sets of resources or two mini resource pools $412_1$ and $412_2$ which include the resources from the overall resource pool 410 to be used only or exclusively for the sidelink communication within the group 402. For the second group 404, the base station 400 provides a second resource pool 414. It is noted that the present invention is not limited to the depicted embodiment, rather, only a single group of UEs may be within the coverage or more than the two depicted groups may be within the coverage of the base station 400. Also, the number of UEs forming the group is not limited to the depicted embodiments, rather, any number of UEs may be grouped together. Also, there may be situations in which all UEs are a member of a group and in such scenarios UEs 406 and 408 may not be present or may belong to one or more groups. Also, the number of mini resource pools 412, 414 reserved or provided for the respective groups may be different, for example, the base station may provide less or more mini resource pools for the group 402 or more than one resource pool 414 for the second group 404.

Moreover, FIG. 5 illustrates an embodiment in which the respective mini resources pools 412, 414 comprise a plurality of continuous resources across a frequency domain and adjacent across the time domain, however, the invention is not limited to such configurations, rather, in accordance with other embodiments, the respective resources forming a mini resource pool 412, 414 may be non-continuous resources across the frequency domain and/or non-adjacent resources across the time domain. Note that resources can also be allocated over the spatial domain utilizing multiple input multiple output (MIMO)-processing at the base station and/or at the UE. The spatial domain can be used in combination with both frequency and/or time domains.

Moreover, in accordance with embodiments, the one or more mini resource pools 412, 414 may include a plurality of groups of resources including at least a first group and a second group, the first and second group having different numerologies, like a different subcarrier spacing, a different slot length or a different number of supported channels. For example, dependent on a quality of service, QoS, requirement resources to be allocated may be selected from a mini resource pool with the numerology needed for meeting the QoS requirements. For example, the mini resource pool 412 or 414 may include the groups of resources having different numerologies. In accordance with other embodiments, the overall resource pool 410 may include the groups of resources with different numerologies, for example, a first group having a first numerology, as indicated at $410_1$, and a second group with a second numerology as indicated at $410_2$. For example, for group 402, the base station provides the mini resource pool 412 including resources from the first group of resources $410_1$ and from the second group of resources $410_2$. For example, a UE being a member of one of the groups 402, 404 may send to the base station 400, directly or indirectly, its QoS requirements and receive, directly from the base station or indirectly from the base station via another group member a confirmation that resources belonging to a needed numerology for meeting the QoS requirements are allocated. Once the confirmation is received, the respective member UE may provide the base station 400 with an estimated data usage so as to allow the base station 400 to allocate the resources for the apparatus from the appropriate mini resource pool.

In accordance with embodiments, each of the above-mentioned groups of resources with different numerologies may include a control region in which control information, like a sidelink control information, SCI, is provided, and the SCI may point to resources in the respective groups of resources where data is present. For example, mini resource pool 414 may include a single group of resources with a common numerology, and a part of the resources may be reserved for the SCI which points to other resources in the mini resource pool 414 where payload data may be found. In the example using different groups of resources, like the mini pools $412_1$ and $412_2$, either each of the mini pools $412_1$ and $412_2$ may include a control region. In accordance with other embodiments, only one of the resource pools $412_1$, $412_2$ includes the control region and the respective information points to a set of resources either in the first mini resource pool $412_1$ or to the other mini resource pool $412_2$ for indicating where data is present.

In accordance with embodiments of the present invention, the above-mentioned groups of resources with different numerology may employ different subcarrier spacings, and the respective one or more groups of resources may be referred to as bandwidth parts. In the following, further embodiments are described with reference to the just-mentioned bandwidth parts, however, it is noted that the inventive approach is not limited to groups of resources belonging to different bandwidth parts, rather, the inventive approach is equally applicable to any number of groups of resources using a different numerology.

Figure 6:
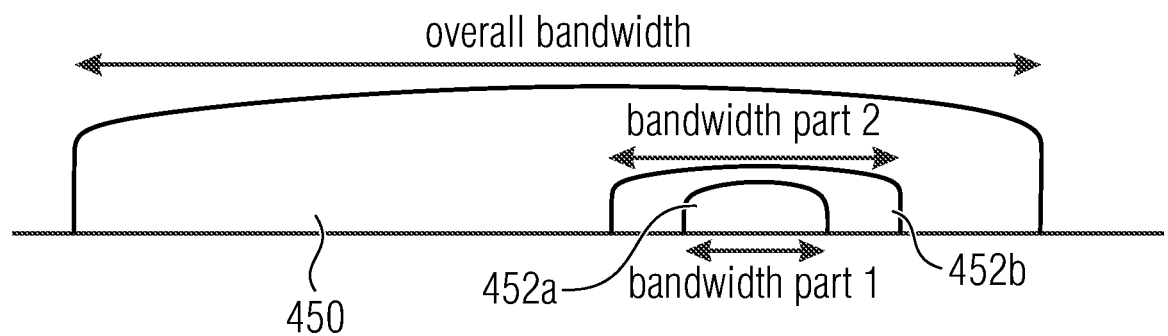
FIG. 6 schematically illustrates the concept of bandwidth parts.

NR 5G systems introduce the above-mentioned concept of bandwidth parts, BWPs. Due to the wide bandwidth operation of NR 5G systems, UEs may only be able to transmit and receive in a frequency range which is a subset of the entire bandwidth. The bandwidth may be adapted according to the needed throughput which improves the energy efficiency of the system. In particular, a UE performs decoding only of a smaller part of the entire bandwidth thereby saving energy and thus battery power, especially since the power consumption of an analog-to-digital converter, ADC, scales with the size of the bandwidth. FIG. 6 schematically illustrates the concept of bandwidth parts and illustrates at 450 the overall bandwidth available, as well as two bandwidth parts 452*a* and 452*b* having a bandwidth being less than the overall bandwidth 450. Another benefit of the BWP concept is that fast reaching between different sub carrier spacings is possible, and that also UEs having only low bandwidth capabilities are supported on wide band carriers. Moreover, load balancing between the overall transmission bandwidth is improved. A BWP includes a set of continuous resource blocks within the entire bandwidth of the system, and each BWP is associated with a specific numerology, like a sub carrier spacing, SCS, and a respective sidelink prefix. A BWP may be equal or larger than the size of a synchronization sequence, SS, block, also referred to as SSB, and may or may not contain the SSB. A UE may have up to four BWPs configured for the downlink and for the uplink each, however, only one BWP for the uplink and for the downlink may be active at a given point in time. The NR sidelink will include a resource partitioning concept based on BWPs taken from NR downlink and uplink.

Figure 7:
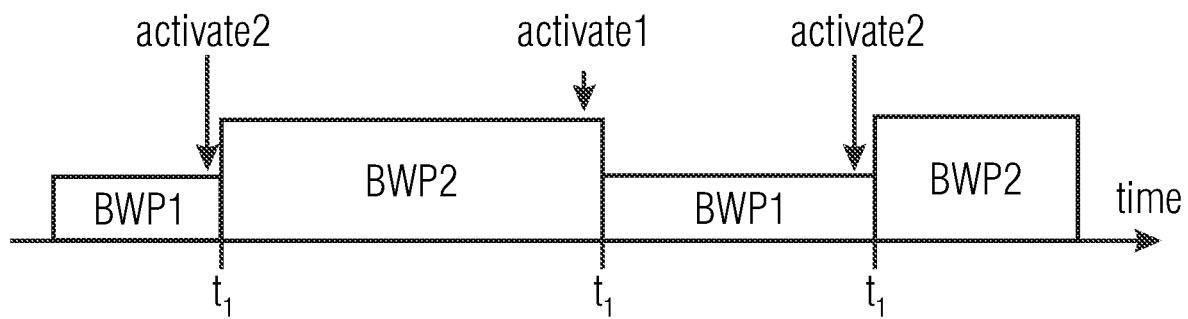
FIG. 7 illustrates the activation of BWPs with different numerologies and/or different bandwidth size.

FIG. 7 illustrates the activation of BWPs with different numerologies and/or different bandwidth size. A first bandwidth part BWP1 of a first, lower bandwidth and a second bandwidth part BWP2 of a higher bandwidth is illustrated. Over the time, responsive to a signaling, like the RRC signaling, the respective BWPs may be activated. In the example of FIG. 7, initially, the first bandwidth part BWP1 is active. At a time $t_1$, the bandwidth part BWP1 is deactivated and the bandwidth part BWP2 of higher bandwidth is activated, by external signaling, as is schematically illustrated in FIG. 7 by the signal "activate2", meaning that now the bandwidth part BWP2 is to be activated causing a deactivation of the first bandwidth part BWP1. At time $t_2$ the first bandwidth part is activated once again, and at time $t_3$ the second bandwidth part is activated again. The durations may be the same or different. A BWP may overlap in frequency or may cover different bandwidths. In the downlink, for switching between BWPs, the receiver is provided with some gap time to allow for retuning of the radio front end, RF, as is illustrated in FIG. 7 where it may be seen, that the respective activate signals are received slightly ahead of the actual switching time $t_1$, $t_2$ and $t_3$.

The bandwidth parts may include at least one control resource set, CORESET, with a UE-specific search space, USS. A CORESET may also be configured to contain a common search space, CSS, which besides UE specific signaling may be used for specific purposes such as system information, paging, group information and the like. A USS is the space across time and frequency which a UE monitors for possible reception of control information specifically configured and directed to this very UE. A CSS, on the other hand, is the space across time and frequency which is monitored by the UE for possible reception of control information that is configured to be received or monitored by all UEs. Further, in accordance with embodiments, the CORESET may also be configured to contain a group search space, GSS, which is the space across time and frequency which a group member UE monitors for possible reception of control information specifically configured and directed for the group to which the UE belongs.

The selection of a set of resources having the desired SCS may depend on the application requesting for resources to transmit, and it is up to the application to decide what quality of service, QoS, is expected from the network. Based on this decision by the application, the QoS requirement is translated into the reliability, latency and priority requirements at the network. In case of group communications, the formation of the group, like group 402 or 404 in FIG. 5, may be handled by the application service which generates a group ID which may be passed to the network. The wireless communication network manages the group, for example the creation and destruction of a group, as is described, for example, in 3GPP TR 22.886 V16.0.0, June 2018. In the embodiments described so far, the base station 400 is provided so as to select, for a communication among group members of the groups 402, 404 respective resources which are defined in the mini resource pools 412, 414 and these resources in the mini resource pools are for exclusive use for the communication among the respective UEs in the groups 402, 404.

In accordance with further embodiments, one or more of the groups 402, 404 may include at least one UE, for example UE $402_1$ of group 402 which is also referred to as a leader UE. The leader UE $402_1$ is provided for handling the communication with the base station 400 for obtaining the information about the resources to be used for the communication within the group 402. In the embodiment described above, each of the UEs has been described to indirectly or directly communicate with the base station 400 to obtain information about the mini resource pool to be used for the communication within the respective group. When considering a direct communication of each of the UEs of a group 402 with a base station 400, every member of the group requests the base station for resources based on the amount of data it wants to transmit, and the base station grants the member a set of resources to be used from the mini resource pool 412, 414 associated with the group to which the requesting member belongs. In addition to the resources, also the control information is to be received from the base station and only then the respective member may communicate with other members in the group. Although this process may improve the reliability by a certain degree, it takes up a considerable roundtrip time increasing the latency of a communication among group members so that, despite the UEs being located at a short distance from each other, latency requirements may not be fulfilled for a communication among the group members using the sidelink interface. In addition, since each of the members of the group needs to communicate with the base station for receiving the control information and the resource information, a substantial overhead in control signaling takes place within the coverage using up available resources for actual communication resulting in a method of communication with a low efficiency.

Embodiments of the inventive approach address this issue and provide for a more efficient method of communication among users or user devices belonging to the same group. For example, one or more of the groups 402, 404 may include one or more user devices selected for a communication with the base station 400, which are referred to also as leader or host UE. In the example of FIG. 5, it is assumed that group 402 includes a leader $402_1$. For example, each of the groups 402, 404 may have assigned a group ID, for example by the application to be executed, as mentioned above, and each member of the group, also referred to as remote, RV, UE is aware of the group ID. Communication between the RVs and the leader of the group, also referred to as the host UE, may be carried out internally using the group ID and the sidelink communication interface which, in turn, allows to meet the desired latency and reliability requirements defined by the application so as to meet a desired quality of service. For example, when considering the platooning of a plurality of vehicles being equipped with respective user devices and being grouped together into a single group, the meeting of the desired latency and reliability requirements is important for the working of the group communications as each UE travels with very short distances between each other in order to achieve the desired advantages of platoon driving, like reduced wind resistance, high fuel efficiency and the like. Using the sidelink communication among the member UEs any message which has to be delivered with a low latency, like an emergency message, may be transmitted among the UEs with the needed latency and reliability thereby providing each of the vehicles equipped with the UEs enough time to react. However, to avoid the above-mentioned drawbacks in terms of inefficient communication and signaling overhead with a base station, in accordance with embodiments of the present invention, the leader UE $402_1$ of the group 402 is used to request the set of resources or the mini resource pool, mRP, from the resource pool 410 for the entire group which is advantageous as it eliminates the need for each individual member $402_2$, $402_3$ to request for its own separate resources from the base station. The members of the group communicate using the resources within the allocated mini resource pool 412. In other words, in accordance with embodiments, in the group 402, the request for resources is only handled by the leader UE $402_1$ and the remaining UEs $402_2$ and $402_3$ do not communicate with the base station 400 for obtaining an information about resources to be used for the group internal communication using the PC5 interface. Thus, the signaling between the group 402 and the base station 400 for obtaining the needed control information and information about the resources to be used may be reduced substantially because only the leader UE $402_1$ communicates with the base station 400 to receive this information, and the other UEs do not communicate with the base station. It is noted that in accordance with the present invention, the respective other UEs $402_2$ and $402_3$ of the group 402 may communicate directly with the UE 400 for any non-group communication. For example, in case a certain situation is detected by the UE $402_3$ that may be of interest for all UEs within the coverage of the base station 400, like an accident or a severe weather condition, in the case of a platooning use case, the UE $402_3$ may signal this within the group using the PC5 interface and, in addition, it may signal this to the base station 400 for distribution to other UEs within the coverage or to the application, and/or to other nearby UEs not belonging to the same group using the SL interface.

Groupcast Sidelink Procedures

In accordance with embodiments of the present invention, when a groupcast communication is carried out, the group may be in-coverage, i.e., managed by the base station, or it may be out-of-coverage so that the resources are autonomously managed. When considering that a leader or HV UE has been selected, like $402_1$ in FIG. 5, in accordance with embodiments, the HV UE $402_1$ requests a set of resources or a mini resource pool from the resource pool 410 for the entire group 402. This eliminates the need for each individual member to request its own separate resources from the base station as the members communicate using those resources indicated within the allocated mini resource pool 412. As mentioned above, conventionally, the base station 400 allocates resources to group members, like V2X members, based on the amount of data contained in the buffer status report. However, this brings the above-mentioned drawbacks in terms of roundtrip time and signaling overhead, and when considering use cases which need a low latency and a high reliability, like in the case of platooning which is an enhanced driving use case, in accordance with the present invention, the amount of resources that are preemptively reserved, for example, delay critical guaranteed bitrate, GBR, resources. The preemptive reservation of these resources for the group may be based on any one or more of the following parameters or any combination of the following parameters:

(1) a size of the group,
(2) a numerology, like the subcarrier spacing, of the resource pool,
(3) an amount of data needed to perform critical groupcast specific communications,
(4) a needed latency, for example in the form of a Pro-se Per Packet Priority, PPPP, or a Packet Delay Budget, PDB,
(5) a needed reliability, like the Pro-se Per Packet Reliability, PPPR or a packet error rate,
(6) a communication range, e.g. distance between individual group member UEs,
(7) a QoS class identifier, QCI, or 5G QoS indicator, 5QI, metrics.

Once the needed resources have been selected, in case of a groupcast communication, the leader UE transmits a request message/signal to the base station 400 for resources for the entire group 402. The leader UE may either transmit sidelink UE information or a buffer status report, BSR, to the base station along with the group ID. The group ID serves as a unique identifier for the group which includes the leader UE and the other member UEs, like group 402 including as a leader UE the UE $402_1$ and as RV UEs the UEs $402_2$, $402_3$. In the situation as depicted in FIG. 5, the group 402 is in-coverage so that the base station 400 provides the leader $402_1$ with the set of resources within the mini resource pool 412 to be used for the group members of group 402 only, i.e., for those UEs having the same group ID. As mentioned above, the set of resources selected is referred to as a mini resource pool, a sub-pool or the like.

Figure 8A:
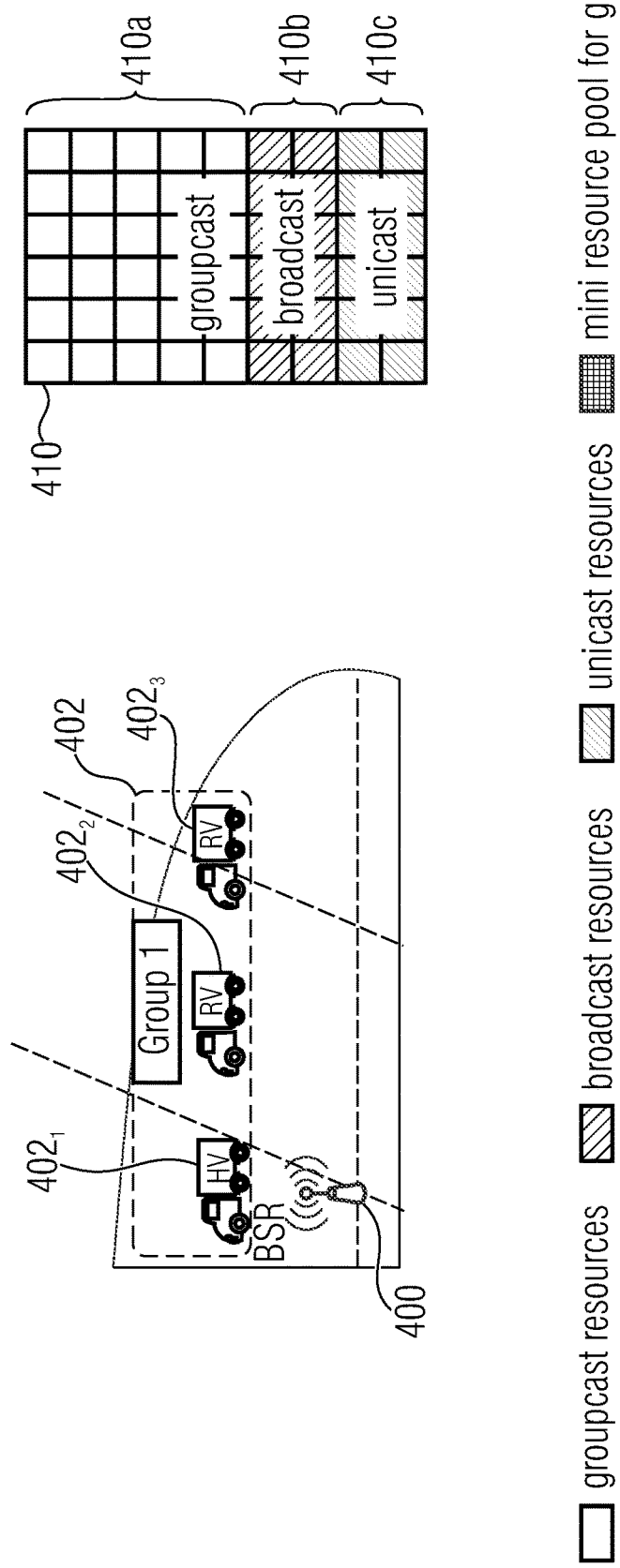
FIGS. 8A, 8B, 8C illustrate an embodiment of the invention in accordance with which a leader UE is provided in a group for communicating with the base station and for relaying information from the base station to the other member UEs.
Figure 8B:
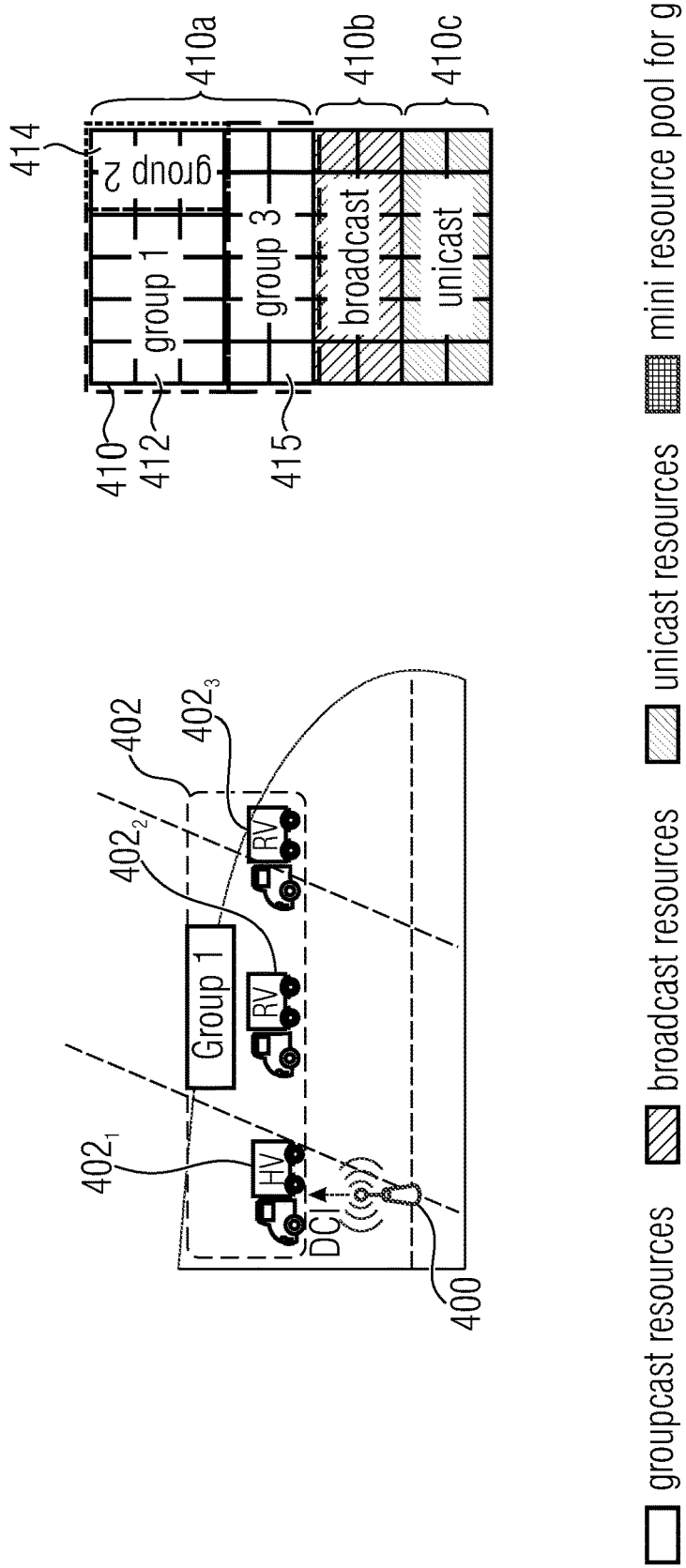
Figure 8C:
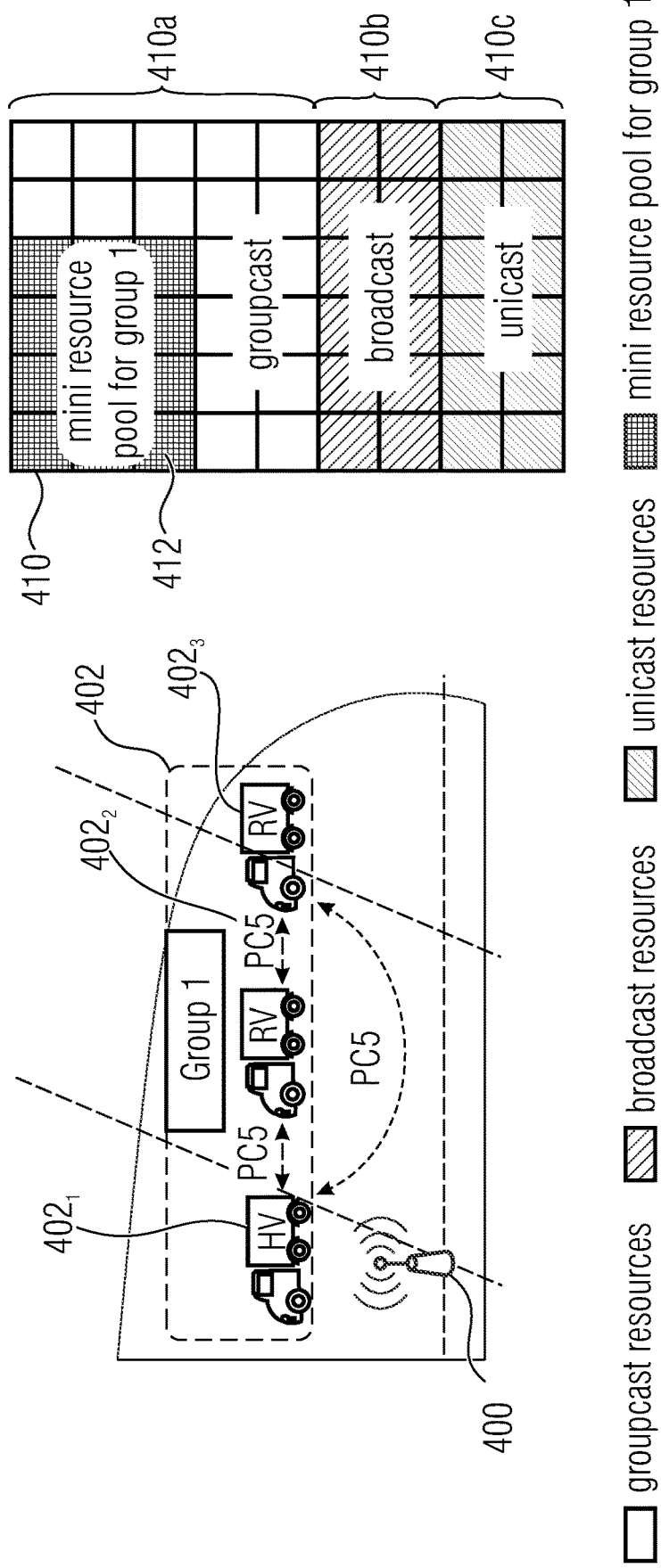

FIGS. 8A-8C illustrate the just described process with reference to a group of vehicles, however, the present invention is not limited to such scenarios, rather instead of the vehicles any kind of group of UEs may be considered, like machines, for example robots, in a factory. In FIG. 8A, the group 402 is indicated which includes three vehicles or user devices $402_1$ to $402_3$ of which the UE $402_1$ is the leader UE, and the other members of the group 402 are RV UEs $402_2$ and $402_3$. On the right-hand side of FIG. 8A, the overall resource pool 410 is shown that may be part of the resources available at the base station 400. The resource pool 410 includes resources to be used for a groupcast, namely the resources 410a to be employed for a communication within one or more groups being in-coverage of the base station 400. Further resources are reserved for a broadcast, namely the resources 410b to be used for a broadcast communication from the base station 400 to all of the UEs within its coverage. Moreover, resources 410c for a unicast communication are reserved in the resource pool 410 to be used by the base station 400 for a direct communication to one of the UEs in-coverage which may also include a direct communication to a UE being a member of a group. In FIG. 8A, the HV UE 402₁ sends a request to the base station 400 so as to request resources for a communication within the group 402. The UE may provide the request to the base station 400 using sidelink UE information or a buffer status report to the BS. In FIG. 8B, the base station 400, responsive to the request, reallocates resources for the entire group within the resources 410a which are dedicated by the base station for groupcast communications. In the example depicted, the base station 400 allocates the resources 412 from the set of resources 410a. Thus, a subset of the groupcast resources is allocated to the first group 402, while other parts may be allocated to other groups that may be present in the coverage and which are not shown in the figure. Following the allocation, as is shown in FIG. 8C, for the group 402 a mini resource pool 412 is now available, and the member UEs 402₁ to 402₃ communicate with each other using the resources of the mini resource pool 412, as is indicated by the PC5 communication in FIG. 8C.

In case the group 402 moves out of coverage, the HV UE 402₁ may either retain the current resource configuration, or it may use a predefined resource configuration obtained from the base station, or it may use a hard-coded resource configuration being present in the UE.

The above-described embodiment, in which only the leader UE requests information about the resources from the base station, avoids that each of the member UEs requests resources from the base station, thereby reducing the scheduling grant overhead at the base station. Moreover, based on the group ID, different groups bearing different group IDs may be assigned different mini resource pools within a standard resource pool.

As described above, the group leader may reserve resources via the Uu interface for PC5 transmissions, and all PC5 based transmissions within the reserved mini resource pool 412 are transparent to the base station. More than one mini resource pool may be reserved by the leader UE from the base station for usage by the group, so that the mini resource pools may belong to groups of resources with different numerology, for example, to bandwidth parts having different subcarrier spacings, SCSs, and, hence, different reliability and latency characteristics. In accordance with embodiments, the quality of the reserved resources may be based on the QoS requirements provides to the core network or the RAN(s) from the application layer which is then translated into priority, latency and reliability requirements so that the base station may allocate resources for the appropriate resource pool to meet the requested criteria. For example, resource pools having higher frequencies or higher subcarrier spacings, may be used for internal communications within the group to closer group members, which may be advantageous for messages that are sent less frequently, for example, cooperative awareness messages, CAM.

Figure 9A:
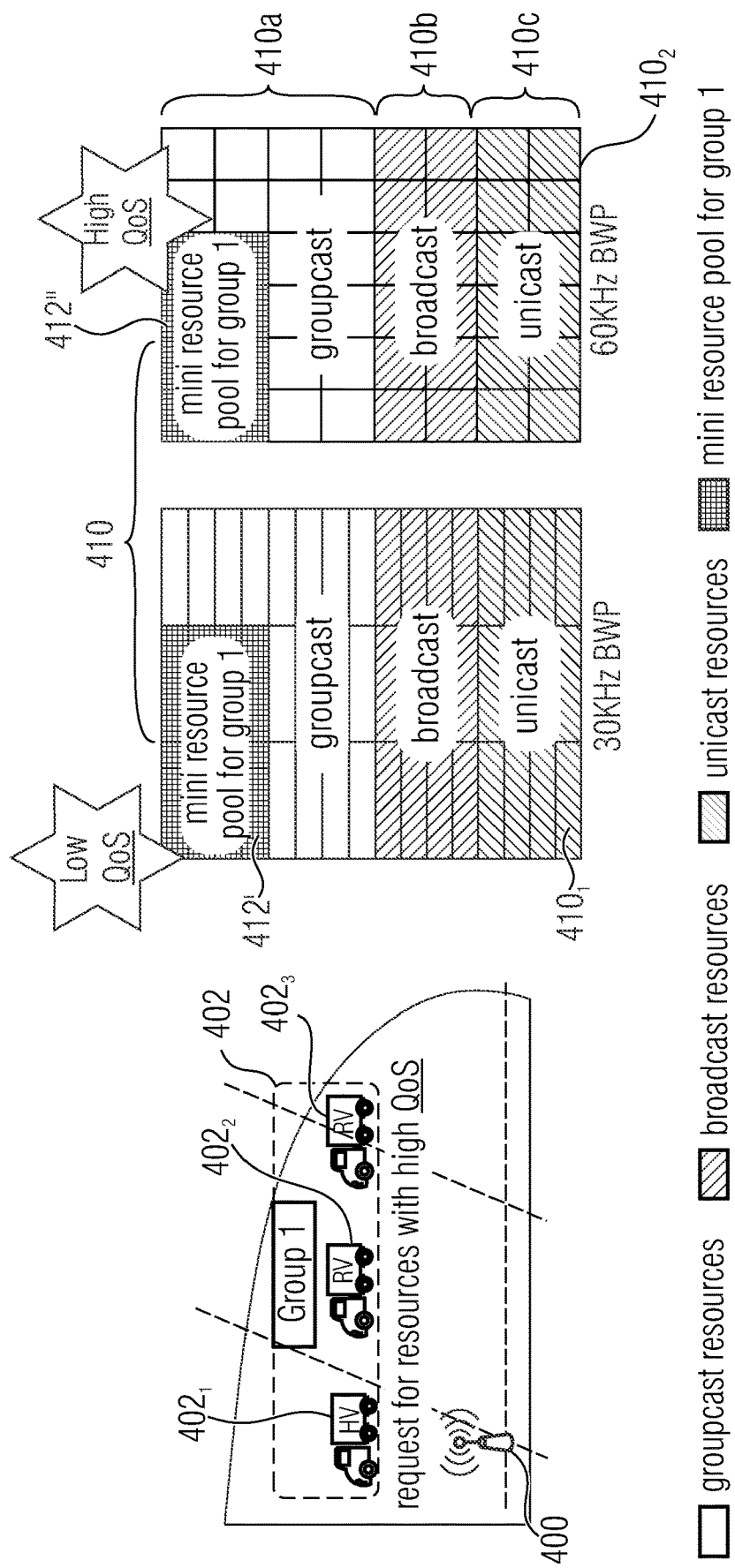
FIGS. 9A, 9B illustrate an embodiment in which mini resource pools are allocated to a group based on the QoS requirements.
Figure 9B:
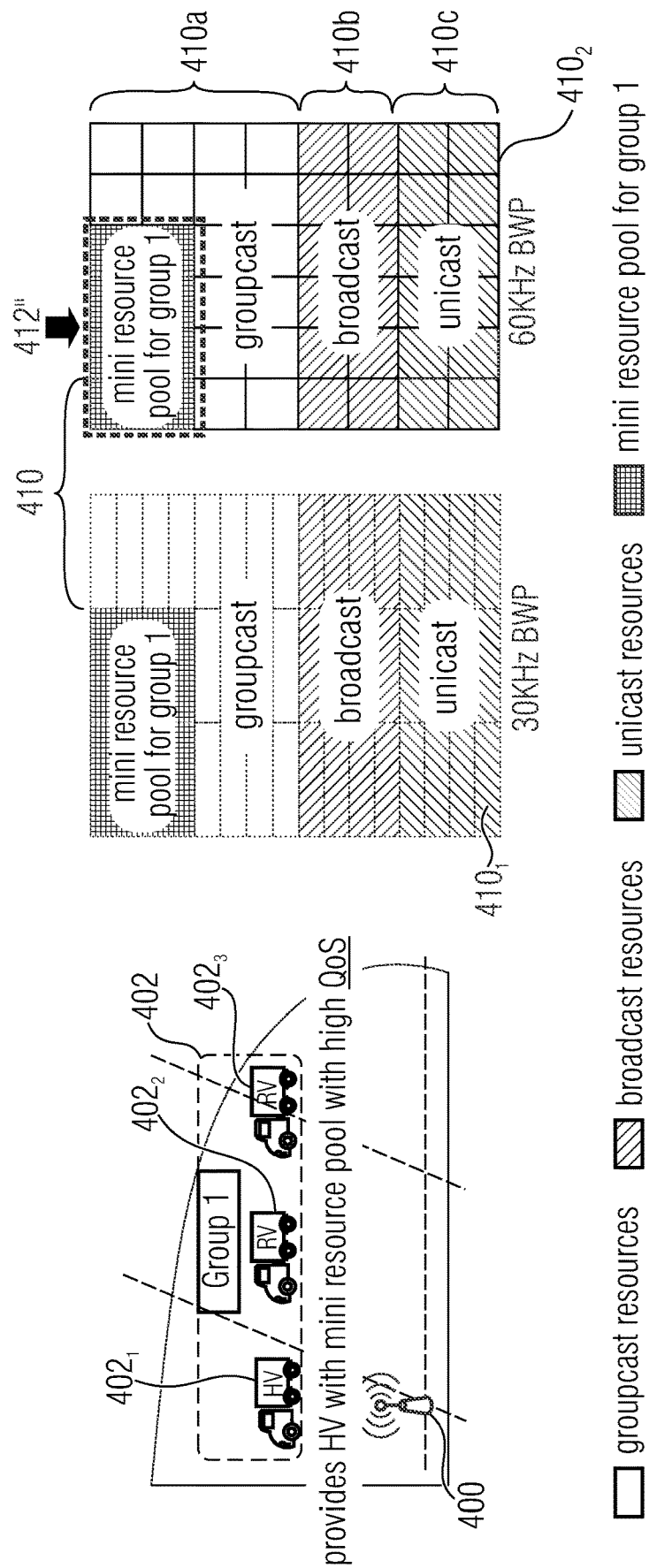

FIGS. 9A-9B illustrate an embodiment in which mini resource pools are allocated to a group based on the QoS requirements. In FIG. 9A and FIG. 9B, on the right-hand side, again the group 402, also depicted in FIGS. 8A-8C are illustrated and on the right side, the resource pool or at least a part of the resource pool 410 available at the base station is depicted. The resource pool 410 at the base station includes a first group of resources 410₁, also referred to as a first bandwidth part with a first subcarrier spacing of 30 kHz, and a second group of resources with a different numerology, for example a second bandwidth part with a subcarrier spacing of 60 kHz. In each of the groups 410₁ and 410₂, a mini resource pool 412' and 412" for the first group 402 is allocated, the mini resource pool 402' providing resources meeting first quality of service requirements and the second resource pool 412" providing resources for meeting second quality of service requirements, the second quality of service requirements being higher than the first quality of service requirements. As is shown in FIG. 9A, the leader UE 402₁ requests from the base station resources with the second quality of service requirements, and, as a consequence, as shown in FIG. 9B, the base station 400 provides the leader UE 402₁ with the appropriate resource pool 412" having the corresponding subcarrier spacing. It is noted that not only on the basis of the quality of service requirements, the allocation of the mini resource pool from the first or second group 410₁, 410₂ may be decided, but also on the basis of the above-mentioned parameters (1) to (7).

Figure 10:
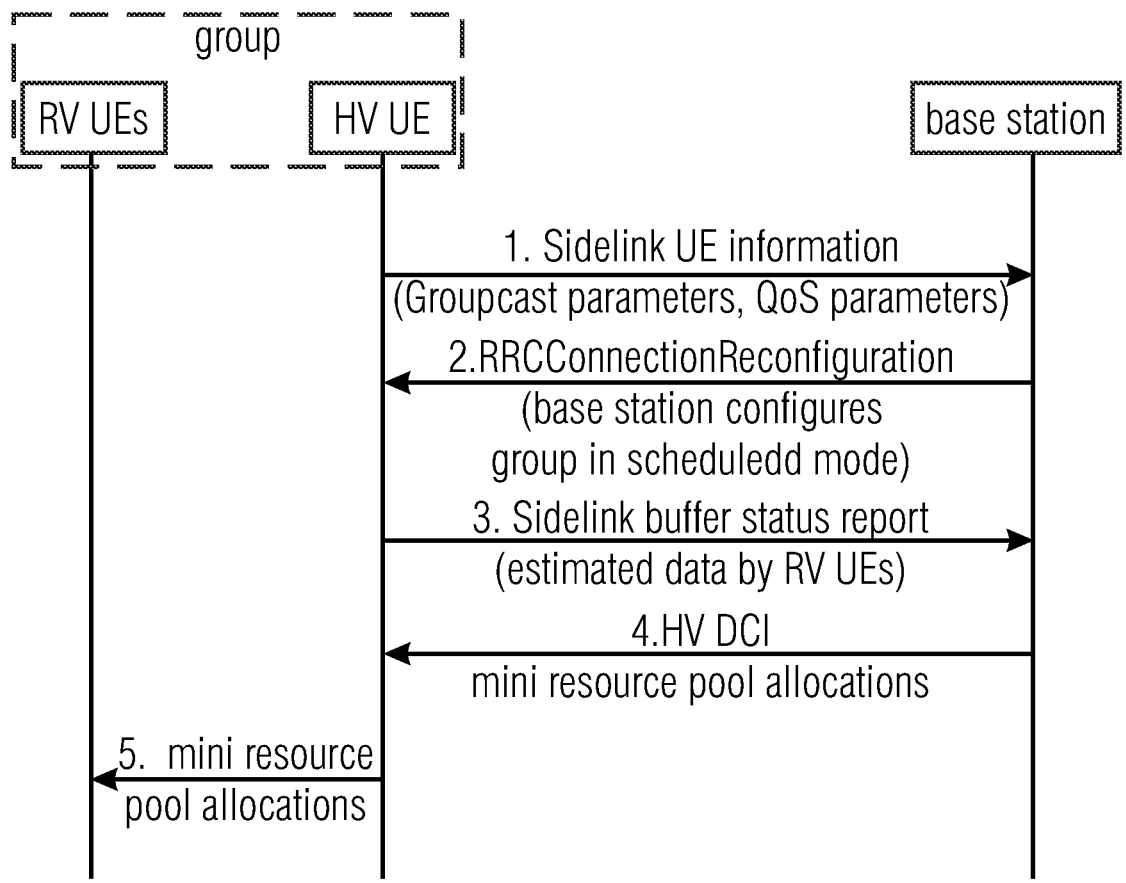
FIG. 10 illustrates an embodiment of a sequence chart of an in-coverage groupcast transmission mechanism.

FIG. 10 illustrates an embodiment of a sequence chart of the in-coverage groupcast transmission mechanism as described in accordance with the embodiments above. It may be seen that the leader UE 402₁ sends, at step 1, the QoS requirements to the base station 400, on the basis of which the base station 400 configures the mini resource pools 412' and 412" belonging to the different subcarrier spacings. The base station 400 responds, at step 2 either with a confirmation that the base station 400 will allocate the resources, or, in case this is not possible, that the leader 402₁ needs to fallback, e.g. timer-based, to a predefined set of resources either stored earlier or hardcoded in the UE. Following step 2, if the base station 400 agrees to allocate resources, the leader 402₁ provides the base station 400 at step 3 with the estimated data usage of the group 402, responsive to which the base station 400, at step 4, allocates the appropriate mini resource pool for the entire group 402. At step 4 a DCI message is received at the leader UE 402₁ from the base station 400 which, with respect to the groupcast communication includes information about the group ID, the lowest index of the sub-channel allocation to the initial transmission for a group, and the frequency resource location of the initial transmission and retransmission for the group. The leader UE may read or decode the DCI based on its unique RNTI. The leader UE 402₁, at step 5, informs the member UEs 402₂, 402₃ about the mini resource pool allocation obtained from the base station 400.

Figure 11:
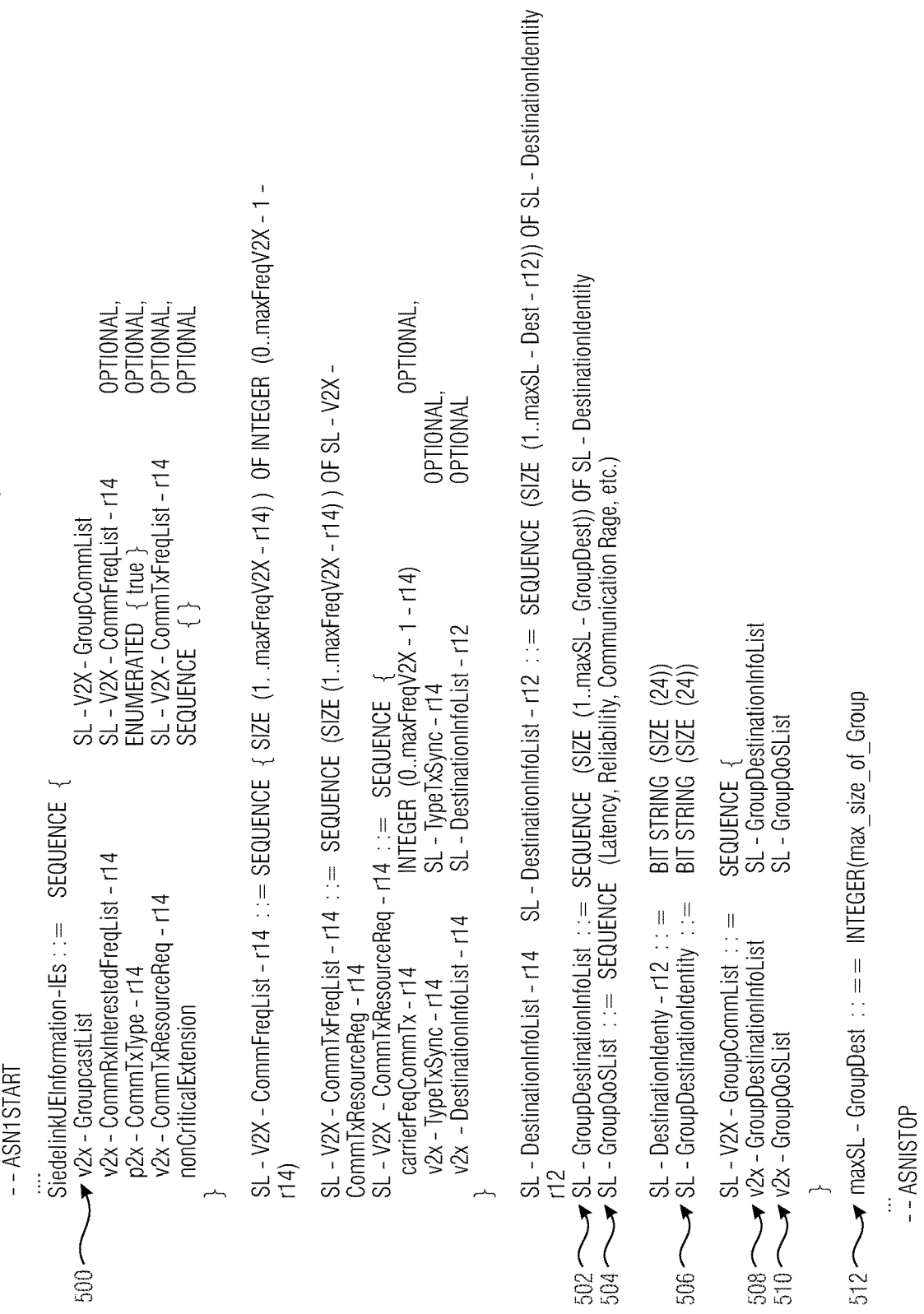
FIG. 11 illustrates an example for a sidelink UE information message sent at step 1 in FIG. 10 from a leader UE to a base station.

FIG. 11 illustrates an example for a sidelink UE information message sent from the UE 402₁, the leader UE, at step 1 to the base station 400, which, in addition to a conventional sidelink UE information message includes the following:

the SidelinkUEInformation-IEs includes a v2x-GroupcastList 500 defining the group using a SL-V2X-GroupCommList specifying the group members including the leading vehicle sharing a Group ID and individual member ID within the group and associated QoS requirement of group.

the SL-GroupDestinationInfoList 502 defining members of the group who are able to receive group related communications using a SEQUENCE (SIZE (1 . . . maxSL-GroupDest)) OF SL-DestinationIdentity.

a SL-GroupQoSList 504 defining the actual QoS parameters including latency, reliability, communication range, etc.

a SL-GroupDestinationIdentity 506 defining a member ID of each member within the group as a BIT STRING (SIZE (24)).

the SL-V2X-GroupCommList which includes a v2x-GroupDestinationInfoList 508 defining the group members based on the SL-GroupDestinationInfoList and a v2x-GroupQoSList 510 defining the QoS requirements based on the SL-GroupQoSList.

a maxSL-GroupDest 512 defining as an INTEGER (max_size_of_Group), which indicates the size of the maximum size of the group.

FIG. 12 illustrates a DCI message received at the leader UE $402_1$ from the base station 400 at step 4 which, with respect to the groupcast communication includes the following group ID 514, lowest index 516 of the subchannel allocation to the initial transmission for group—bits.

frequency resource location 518 of initial transmission and retransmission for group.

carrier indicator 520, 3 bits.

Bandwidth Parts within Mini Pool Resources

Figure 13B:
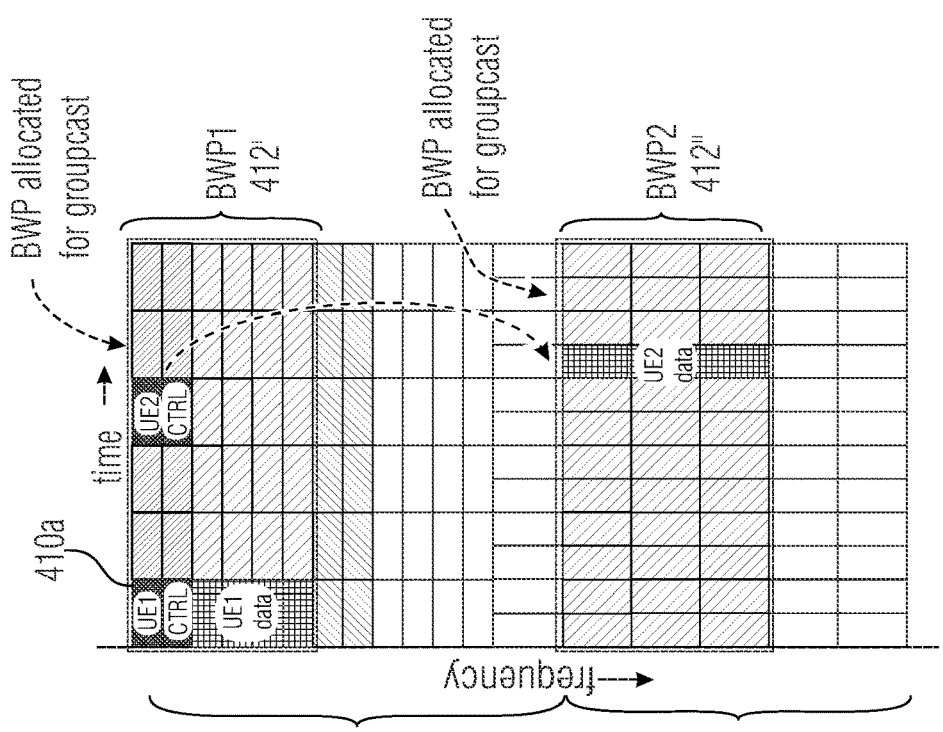
FIGS. 13A, 13B, 13C illustrate embodiments of bandwidth parts within the resource pools with a distributed control configuration (FIG. 13A) or a common control configuration (FIG. 13B)
Figure 13A:
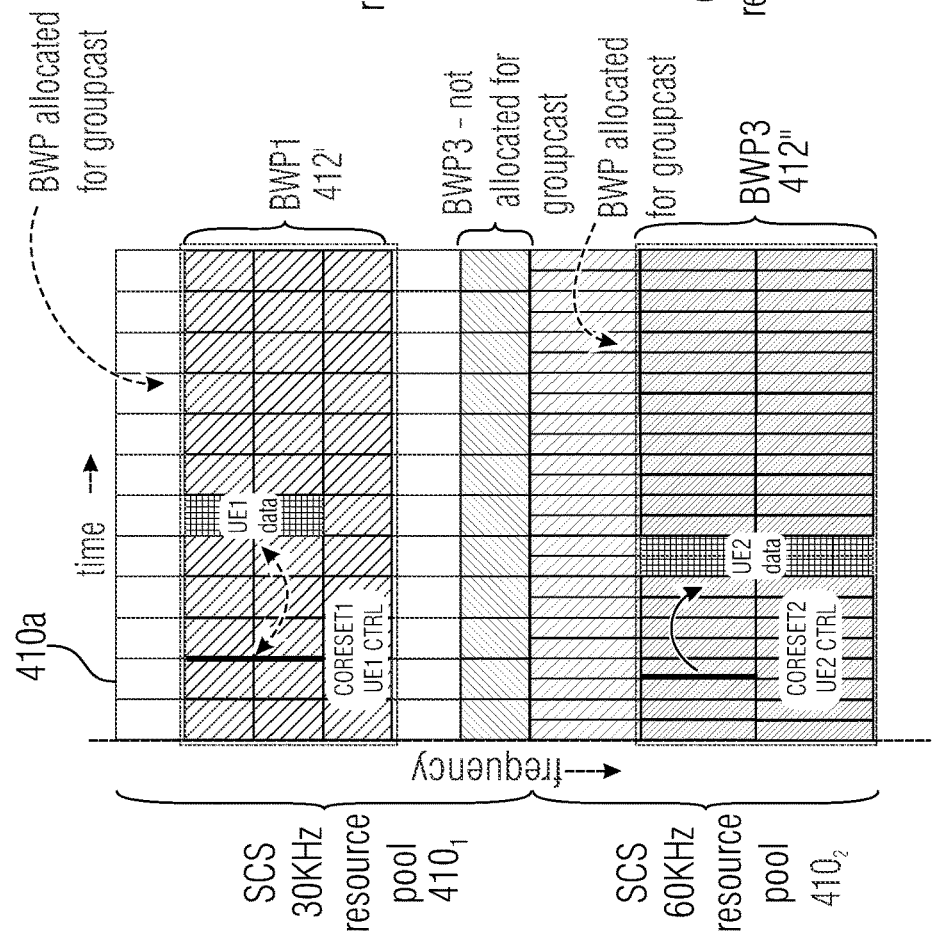
Figure 13C:
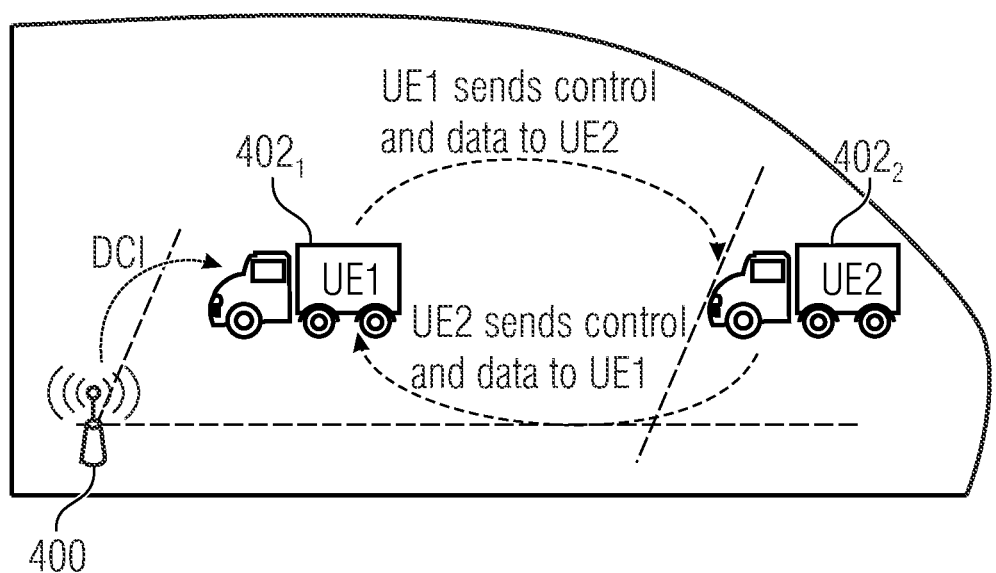

In the following, embodiments are described in accordance with which bandwidth parts are provided within the respective mini resource pools mentioned above. When implementing the concept of bandwidth parts, an entire bandwidth part or a set of bandwidth parts configured to a particular leader UE may be used only within the given group. The bandwidth parts may reside within a resource pool of a given subcarrier spacing. FIGS. 13A-13C illustrate embodiments of bandwidth parts within the resource pools with a distributed control configuration (FIG. 13A) or a common control configuration (FIG. 13B). In FIGS. 13A-13C, the resources or resource pool 410a to be used for groupcast communication is shown which includes, as also described with reference to FIGS. 9A-9B, a first group of resources $410_1$, namely the resource pool having a subcarrier spacing of 30 kHz, and a second group of resources $410_2$ including resources with a 60 kHz subcarrier spacing. Within the groupcast communication resources 410a two bandwidth parts BWP1 and BWP3 are indicated as parts from the respective resource pools $410_1$ and $410_2$ from which resources are allocated for the groupcast for the members of a group. The bandwidth part BWP2, in the depicted example, is not allocated for a groupcast. FIG. 13C indicates the base station 400 which sends to the first UE or leader UE $401_1$ a DCI message, and the leader UE $402_1$ and a further UE $402_2$ communicate with each other in that the first UE $402_1$ sends control and data to the UE using the resources in the allocated mini resource pool and likewise, the second UE $402_1$ send control and data to the first UE $402_1$. A bandwidth part includes a control region, CORESET, that is used to transmit control information which points to the actual location of the data transmission which reduces the amount of resources a member UE $402_2$, $402_1$ need to monitor for control information.

FIG. 13A illustrates the case in which each of the bandwidth parts 412' and 412" being allocated to the group 402 includes the respective control regions CORESET1 and CORESET2 which point to resources in the corresponding bandwidth part where data from the respective UEs is present. Thus, in FIG. 13A, there are two resource pools $410_1$, $410_2$, defined, one having an SCS of 30 kHz and the other having an SCS of 60 kHz. Only BWP1 and BWP2 are allocated as mini resources pools 412' and 412" for group communications, while BWP3 may be allocated for V2X but not for a groupcast, for example, for a unicast or a broadcast communication. Each of the bandwidth parts includes the CORESET regions in which $UE_1$ and $UE_2$ transmit the SCI first which points to the resources where the data is present or transmitted.

In accordance with other embodiments, not all bandwidth parts allocated to a group include a control region. Such an embodiment is depicted in FIG. 13B, which is similar to FIG. 13A except that the first resource $410_1$ has a subcarrier spacing of 15 kHz and that the second resource pool $410_2$ has subcarrier spacing of 30 kHz. Again, the mini resource pool is formed by the two bandwidth parts 412' and 412" from the different resource pools $410_1$ and $410_2$. In the embodiment of FIG. 13B not all of the bandwidth parts include a control region, rather, the control region for both UEs $402_1$ and $402_2$ depicted in FIG. 13C, are included in the first bandwidth part 412' and the second control information associated with the second UE points to the data which is present in the second bandwidth part, as is indicated by the arrow pointing from BWP1 to BWP2. Thus, in FIG. 13B, there are two resource pools $410_1$, $410_2$, defined, one having the SCS of 15 kHz and the other having the SCS of 30 kHz. BWP1 and BWP2 are allocated for group communications, and the bandwidth part of mini resource pool 410' within the 15 kHz SCS resource pool maintains the structure of an LTE VTX resource pool, with control and data sub-channels defined. The mini resource pool 412' contains the control sub-channel where control information for all of the UEs of the group is transmitted which reduces the burden of the UEs to monitor multiple control channels to receive the SCI being transmitted by other UEs. In this example, $UE_1$ $402_1$ sends the control and the data in the BWP1 or resource pool 412', but $UE_2$, $402_2$, send the control alone in the control sub-channel in the BWP1 and points to the data in the BWP2.

Mini Resource Pools within Bandwidth Parts

In accordance with other embodiments of the present invention, the resource pools or set of resources to be used for the group communication may be defined within bandwidth parts having different subcarrier spacings. The resource pools within a bandwidth part may be defined based on the type of communications, like broadcast, groupcast or unicast, and within the defined resource groupcast resource pool, one or more mini resource pools may be defined for each individual group, which are now be described in more detail with reference to FIGS. 14A-14B.

FIGS. 14A-14B illustrate the resources or a subset of the resources 410 available at the base station including a first bandwidth part BWP1 with a 30 kHz subcarrier spacing and a second bandwidth part BWP2 with a 60 kHz subcarrier spacing. Within each of the bandwidth parts resources 410a to be allocated for a groupcast communication are defined, and from the resources 410a within each bandwidth part a mini resource pool for the group 401 (see FIG. 13C), namely resource pool 412' and resource pool 412" are defined. As is depicted in FIG. 14A, the respective mini resource pool may include some or all of the resources from the groupcast communication resources 410a, as is indicated by mini resource pool 412' including only a subset of the available resources from area 410a in bandwidth part BWP1, while mini resource pool 412" includes all resources of the groupcast communication resources 410a in the second bandwidth part BWP2. In FIG. 14A, in a similar way as in FIG. 13A, each of the bandwidth parts BWP1 and BWP2 includes control regions so that, for example, UE1 provides the control and the data within the first bandwidth part BWP1, and the UE2 (see FIG. 13C) provides the control and the data in the second bandwidth part BWP2.

In accordance with other embodiments, described with reference to FIG. 14B, in a similar way as described above with reference to FIG. 13B, not all of the bandwidth parts need to include a control region. In FIG. 12B, there are two bandwidth parts BWP1 and BWP2 defined, as in FIG. 14A, however, in the second bandwidth part BWP2, no control information is transmitted, rather, all control information is transmitted in the first bandwidth part having the SCS of 30 kHz and for the second UE, the control information points to resources in the second bandwidth part where the data for the second UE is present. Thus, in accordance with FIG. 14B, a common control region or common CORESET may be defined where all the control information is transmitted. This approach, as described above with reference to FIG. 13B, is advantageous as all member UEs of the group have to scan only a fixed set of control resources at all times.

Groupcast Resource Retention in Out-of-Coverage Scenarios

As described above, the mini resource pool for a group of UEs is defined when being in-coverage with the base station, and the behavior of the group, when it leaves the coverage area may be such that a current resource configuration is retained, that a predefined resource configuration is applied or that a hardcoded resource configuration is used.

In case of retaining the current resource configuration, the group retains the resource set obtained from the base station even when it moves out of the coverage of the base station which enables the group members to use the mini resource pool even when out of coverage. The defined mini resource pool may be maintained for a certain duration of time, after which the leader UE may carry out a sensing of known predefined resource pools to be used when being out of coverage so as to alter or completely change the set of resources to be used for the group communication within the group. The group leader may also instruct other group member UEs to perform sensing and may collect the sensing results. This may aid the group leader in choosing interference-free resources for the group communication.

Note, retaining a resource pool for out-of-coverage scenario may be based on a timer. If the timer threshold is reached, the group leader may instruct group member UEs to fallback to use a predefined resource configuration, i.e. transmit and receive mini resource pools or other resource pools.

When using a predefined resource configuration, the group may shift its resource configuration to a predefined resource configuration selected from one or more configurations obtained earlier from the base station when the group was in-coverage with the base station.

When applying a hardcoded resource configuration, the group may shift its resource configuration to a default configuration which is hardcoded in the leader UE. The default configuration is also the configuration that is used in case a group is formed when being out of coverage of a base station. The hardcoded resource configuration remains the default configuration even when the group enters/exits a coverage area where it uses the resources provided by the base station.

Once the leader UE decided which of the above-mentioned approaches is to be used, the leader UE decides the new mini resource pools within the configuration based on the QoS requirements of the group and informs all members of the new set of resources via an appropriate SCI signaling.

Groupcast Communication Procedure

Once the dedicated mini resource pool has been allocated to the leader UE by the base station, the leader UE informs the other member UEs about the mini resource pool by transmitting this information within the group using a control message, for example, a modified SCI message which contains the group ID along with time and frequency parameters needed to define the mini resource pool, together with other parameters. Once the member UEs receive this SCI, the member UEs of the group may listen only to the control channel of the mini resource pool and not to the entire resource pool defined by the base station for a groupcast communication. Further, the member UEs use the mini resource pool for transmissions within the group, using the group ID.

For example, a group resource configuration SCI message transmitted by the leader UE to the other UEs of the group may be referred to as HV Group Resource Configuration SCI message which may include one or more of the following:
- the leader or HV UE indicates its own reserved resources visible to other members or RVs so that the RVs do not transmit using this resource,
- a SL SPS configuration index for RVs within group (the message contains resource allocation information for the RV UEs for their own use) based on QoS parameters,
- shared resource indices for broadcast BSM (time and frequency),
- high priority resource indices (time and frequency resources, which may be used by any of the RV UEs at the time of an emergency).

Each transmission of SCI format X may be transmitted in one subframe and two physical resource blocks per slot of the subframe or with higher reliability (more repetitions).

It is noted that in accordance with embodiments, the leader UE may reserve, initially, the resources from the mini pool for its own transmissions and then allocate the remaining resources to the other member UEs.

Groupcast Communication Procedures

Once the members UEs of a group are aware of the one or more mini resource pools to be used, a UE no longer needs to request the base station for any resources for transmission within the group, rather, the UE selects the resources for the transmission among group members from within the predefined mini resource pool.

In accordance with an embodiment, the member UE may use resources which have been allocated to the member UE by the leader UE from the mini resource pool. The amount of resources needed may be based on the data in the member UE's buffer and the QoS requirements associated with the data. An estimate of the data to be transmitted may be provided to the leader UE. Based on this information, the leader UE may decide about the allocation of resources to each of the member UEs within the group thereby increasing the resource allocation efficiency within the group.

In accordance with another embodiment, the leader UE does not allocate specific resources, rather, the member UEs may work in a mode 2, e.g. NR mode 2, or mode 4, e.g. LTE mode 4, like fashion, i.e., they may scan and sense the mini resource pool for resources with a low probability of collisions and select those resources with a low probability of collision for a transmission within the group. Since the UEs are competing only among other members of the group, the probability of collisions and the probability of two members UEs picking up the same resource is low. This increases the efficiency of resource allocation, besides eliminating the need of the UEs to request resources from the base station. This also reduces the load on the base station.

Figure 15:
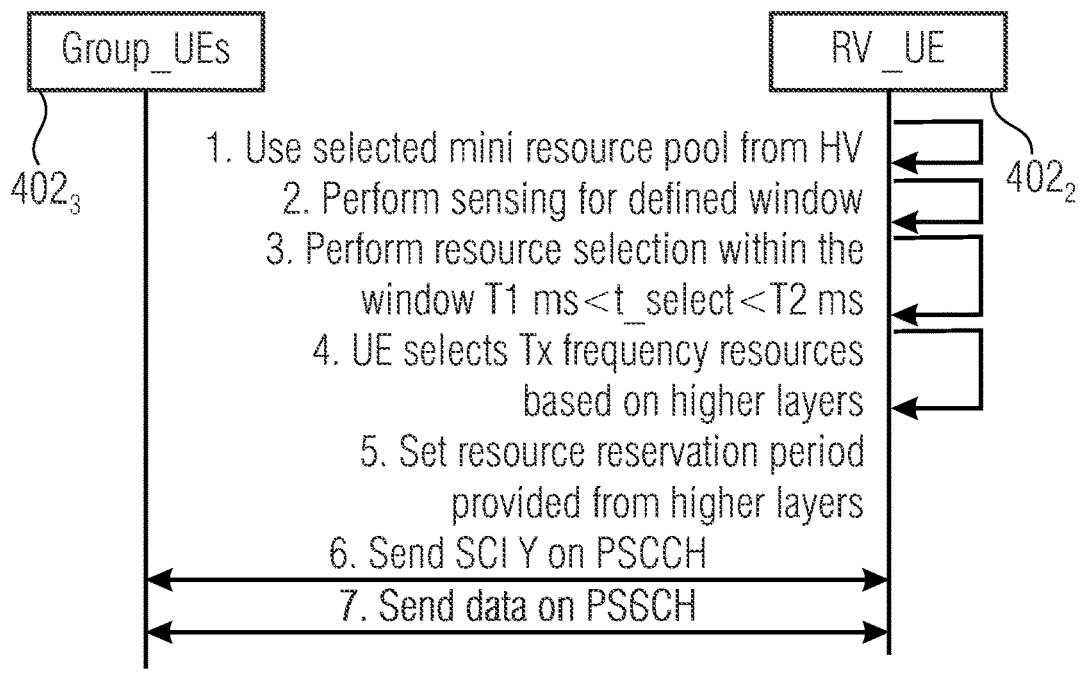
FIG. 15 illustrates an embodiment of a signaling sequence for sensing and selecting transmit resources by a member UE from the mini pool allocated to the group.

FIG. 15 illustrates an embodiment of a signaling sequence for sensing and selecting transmit resources by a member UE from the mini pool allocated to the group. In a first step, the member UE $402_2$ decides to use the mini resource pool as signaled by the leader UE. In a second step, a sensing is performed for a predefined period of time or window, and within the window, at step 3, a resource selection is performed. At step 4, the UE selects the transmit frequency resources as needed by the requirements for the data transmission that may be defined by higher layers, and in step 5 a resource reservation period, as it may be provided by higher layers, is set. Following this, at step 6, a control information, SCI Y, is transmitted, for example, on the physical sidelink control channel, and SCI Y is the control information for a corresponding data transmission based on an existing SCI format 1. Once the control information has been sent at step 6 to the other group members, the data is sent on the physical sidelink shared channel at step 7.

In accordance with other embodiments, the member UE may randomly decide a resource to transmit within the resource set defined by the mini resource pool, for example, based on latency requirements and other QoS requirements of the application requesting further resources. The member UE may then inform the leader UE about its selection and carry out its transmission in the selected resources, and it is up to the leader UE to ensure that the selected resources are not allocated to any other member UE for transmission. This may be used for high priority and emergency scenarios.

Figure 16:
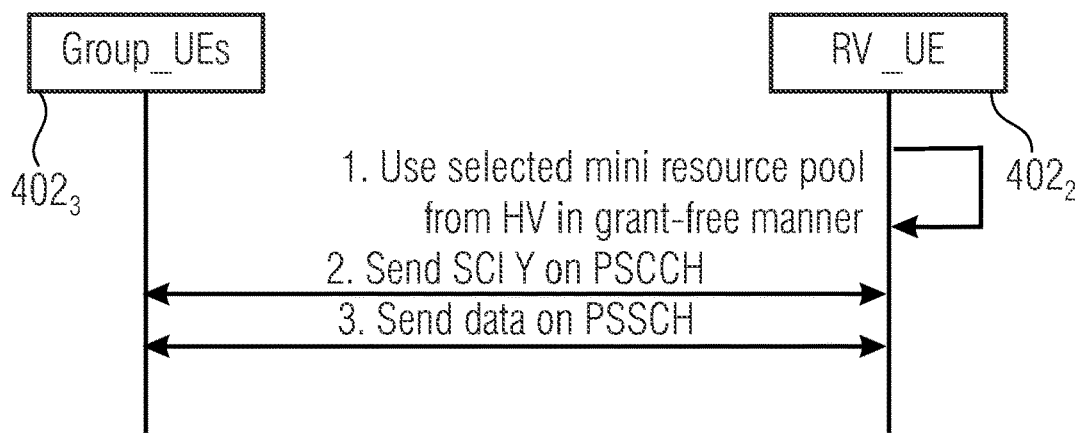
FIG. 16 illustrates an embodiment of a signaling sequence for a grant-free transmission by a member UE.

FIG. 16 illustrates an embodiment of a signaling sequence for a grant-free transmission by a member UE. In a first step, the member UE 402 selects a resource from the mini resource pool in a grant-free manner and informs at step 2 the remaining group members by sending the control information SCI Y on the physical shared control channel followed, in step 3, by the sending of the data in the physical sidelink shared channel. The control information SCI Y is the control information for the corresponding data transmission.

Groupcast and Broadcast Basic Safety Messages (BSM)

In accordance with further embodiments, important messages or safety messages generated within a group may be classified into two categories, namely into a groupcast Basic Safety Message (BSM) and into a broadcast BSM. In case of a groupcast BSM, the important message, like the safety message is relevant only to the members of the group, for example, in case of a group overtaking maneuver in a platooning use case. On the other hand, the broadcast BSM may consider messages which are relevant not only to the group but also to neighboring UEs not being part of the group, for example, when considering the vehicular use cases, in the event of a crash or accident. Given that individual resource sets are defined for a broadcast communication, a groupcast communication and a unicast communication (see the resource sets 410a to 410c described above), the broadcast and groupcast resource sets may be partially shared among each other so as to enable the transmission of the broadcast BSM by a member of the group.

Figure 17:
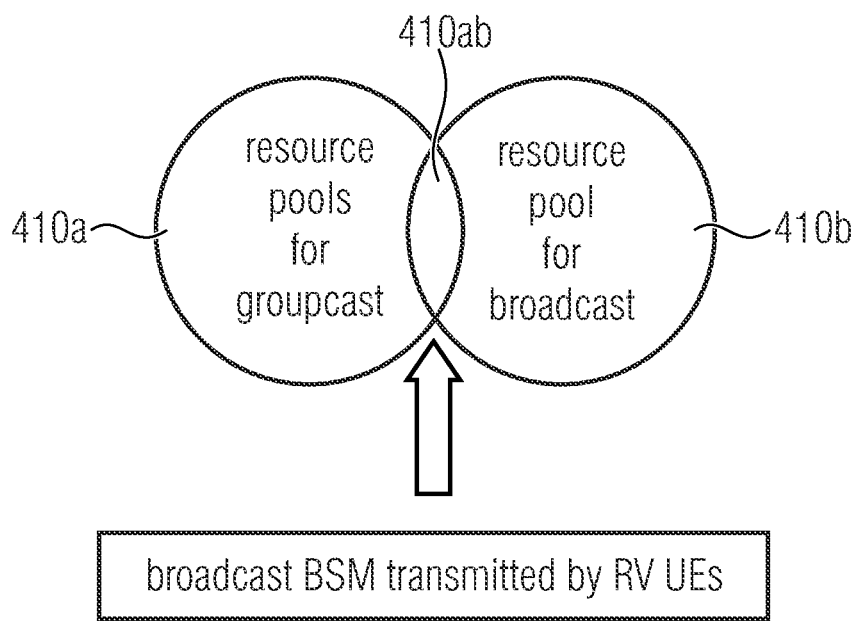
FIG. 17 illustrates an embodiment of a partial sharing of resources for a broadcast communication and resources for a groupcast communication for a broadcast BSM.

FIG. 17 illustrates an embodiment of a partial sharing (as indicated at 410ab) of the resources 410b for a broadcast communication and the resources 410a for a groupcast communication for a broadcast BSM. The partial sharing may be configurable by the leader UE.

In accordance with other embodiments, rather than sharing the resources for the broadcast BSM, each group may have allocated from the resource pool for broadcast communication a common set of resources to be used for transmitting a broadcast BSM.

Platoon Management

In accordance with further embodiments, a group including a group leader may include further UEs having specific roles in addition to being a mere member UE. For example, when a group extends in size, it may be needed, to provide for a relay within the group. More specifically, the number of UEs in the group may raise or the distance of the UE members may increase in such a way that when considering the leader UE to be located at a certain location within the group and when considering the additional UEs being located along an extending direction of the group, a further UE, referred to as a group marshal, GM, UE, may be positioned at a certain position within the group, for example, in the middle of the group, so as to act as a relay for group members, especially those group members being further away from the leader UE than the GM UE so that also member UEs towards the end of the group may successfully receive the control information from the leader UE by relaying through the GM UE. Also, the data may be relayed accordingly. In addition to or alternatively, the group may be provided with a so-called group sweeper, GS, UE, that may be positioned at the end of the group so as to cater the resource allocation issues which may come up when transitioning across zones and coverage areas of base stations or when transitioning across different radio access networks.

For example, the group leader, GL, the group marshal, GM, and the group sweeper, GS, UEs may be initially decided by the base station or by an application when forming the group of UEs. However, over time, the condition of the links between the UEs may vary, for example, in a vehicular use case due to a movement of the vehicles with respect to each other. In order to cater to the potential changes in the link conditions, the member UEs may send out periodic reports about the channel and link conditions to the GL UE, for example, with a periodicity interval of T1. Note that the roles of a group marshal, GM, or a group sweeper, GS, can be used more than once in a group, e.g. if the group exceeds a certain size. Furthermore, if a UE which is a GM or GS leaves the group, another UE which is already configured with the role GM or GS can immediately take over the role, without further configuration by the GL or by the network.

Figure 18C:
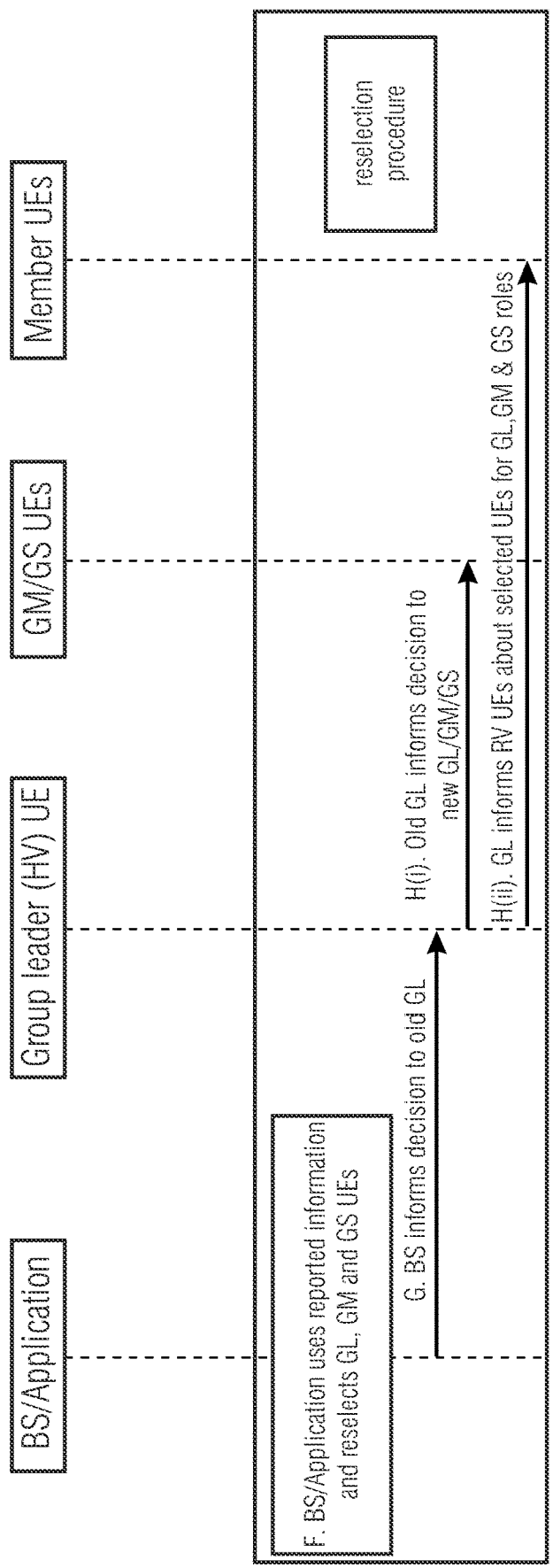

FIGS. 18A-18C illustrate an embodiment of a message flow for the selection of GL, GM and GS UEs when the group is in-coverage. FIG. 18A illustrates the just-described initial decision about the GL, GM and GS UEs by the base station or the application, as is indicated in step A. In step B, the base station informs about the decision and sends out a message to the group identifying within the group members which of the members is the group leader. The information further includes information about which of the member UEs is to be the GM UE and the GS UE, and once the group leader has been determined at steps C(i) and C(ii), the group leader UE informs those member UEs which are now the group marshal and the group sweeper and all remaining member UEs about which UEs are selected for GL, GM and GS.

FIG. 18B illustrates the above-mentioned reporting procedure in accordance with which at step D, all member UEs report channel and link conditions to the group leader, and at step E the group leader UE sends a consolidated report to the base station, for example at a periodicity of T2, where T1 is less than T2. Dependent on the consolidated report, the base station may decide whether a reselection is to be carried out, and FIG. 18C represents the reselection procedure. At step F, the base station or application, using the reported information received at step E, may decide to select new UEs for the roles of the GL or GM or GS UEs or to retain the existing UEs. In case the GL is to be changed, the base station at step G informs the current or old GL UE about the decision which, in turn informs (see steps H(i) and H(ii)) the remaining members about the UEs now being the GL, GM or GS. In case no change in the GL occurs, the GL remains the same and informs the remaining members which of the members are now the new GM or GS. Once the signaling is completed, the new GL or new GM or new GS UEs take over their responsibilities.

Figures 19A, 19B:
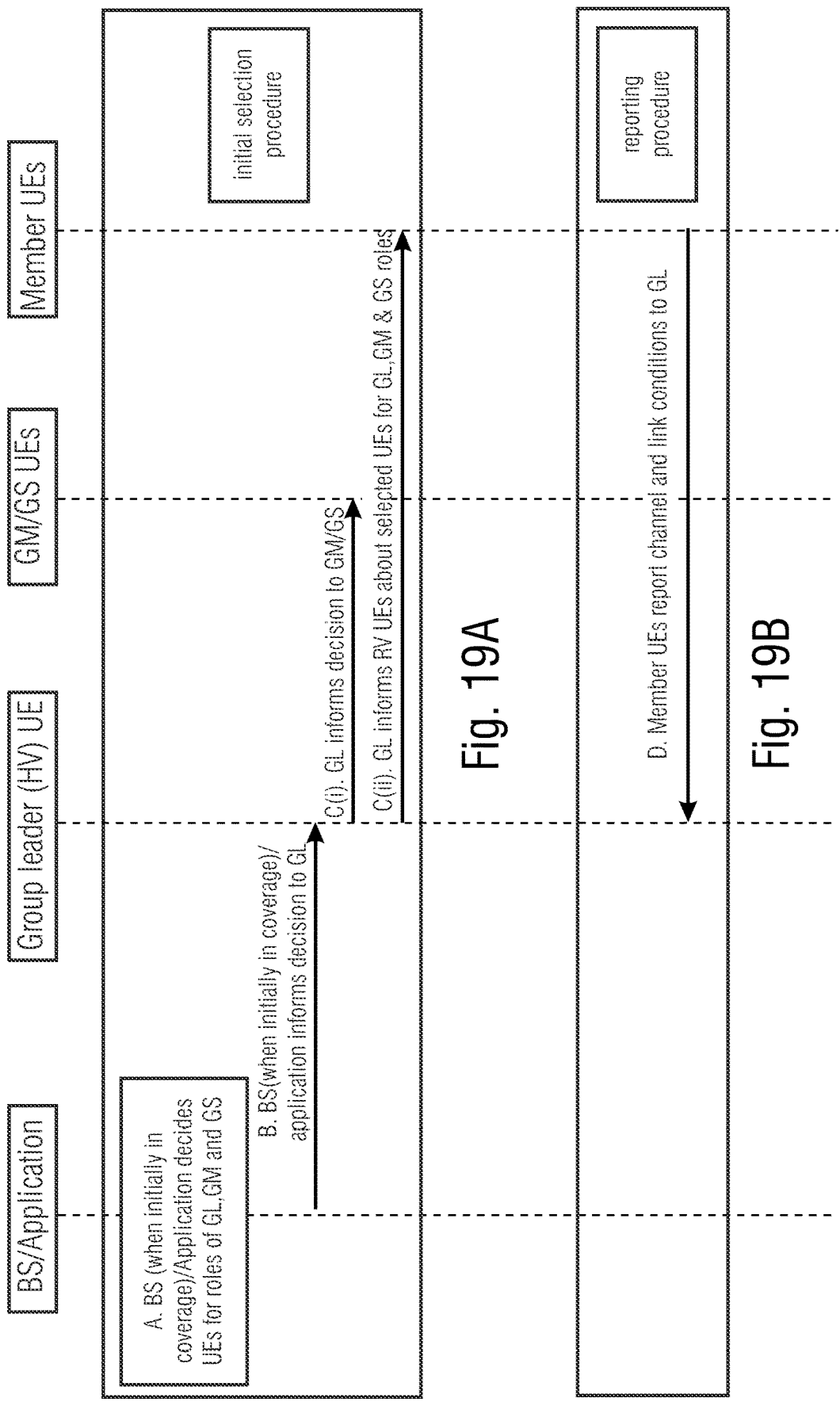
FIGS. 19A, 19B, 19C illustrate an embodiment of a message flow for reselecting the GL, GM and GS UEs when being out of coverage.
Figure 19C:
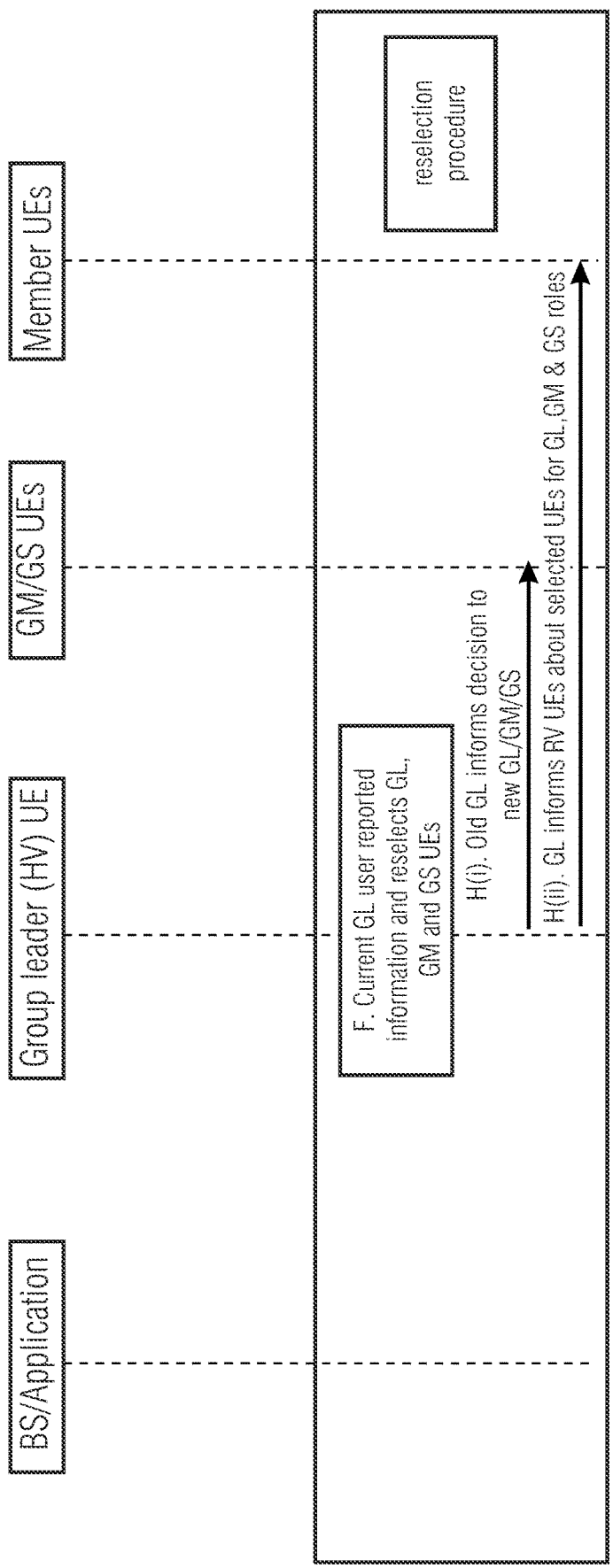

In case the group is out of coverage, the current GL UE may take over from the base station the responsibility for reassigning the roles of the GL, GM and GS UEs based on the periodic reports send by the member UEs. The current GL UE may carry out the decision about the new roles at a fixed interval of time, in order to provision for new UEs entering the group for old UEs leaving the group or for the varying size of the group as such. Once decided, the current GL UE transmits this information within the group so that the new GL, or GM, or GS UEs may take over responsibility. FIGS. 19A-19C illustrate an embodiment of a message flow for reselecting the GL, GM and GS UEs when being out of coverage. In FIG. 19A, again, the initial selection is indicated which corresponds to the above-described initial selection in FIG. 18A. Following the initial selection, it is assumed that the group is out of coverage, so that the reporting procedure in FIG. 19B only includes step B in accordance with which the member UEs report the channel and link conditions to the leader UE. The reselection procedure depicted in FIG. 19C includes, like in FIG. 18C, the step F, however, in this scenario, when the group is out of coverage, it is the current leader UE which uses the reported information to consider a reselection of the leader or the group marshal or the group sweeper UEs which then informs (see steps H(i) and H(ii)) the remaining members accordingly.

In accordance with further embodiments, the base station may decide to release the resources defined by the mini resource pool once it is determined that the group may be dismantled, so that the resources which are part of the groupcast communication resources may be used for allocating a mini resource pool to another group which may have been newly formed within the coverage of the base station. For example, the dismantling of a group may be initiated by the application which, initially, grouped the UEs together, and the respective information may be transmitted to the respective group members either directly via the base station or indirectly via the group leader, in case the group includes such a group leader.

In some of the embodiments described above, reference has been made to respective vehicles being either in the connected mode, also referred to as mode 1 or mode 3 configuration, or vehicles being in the idle mode, also referred to as mode 2 or mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 20:
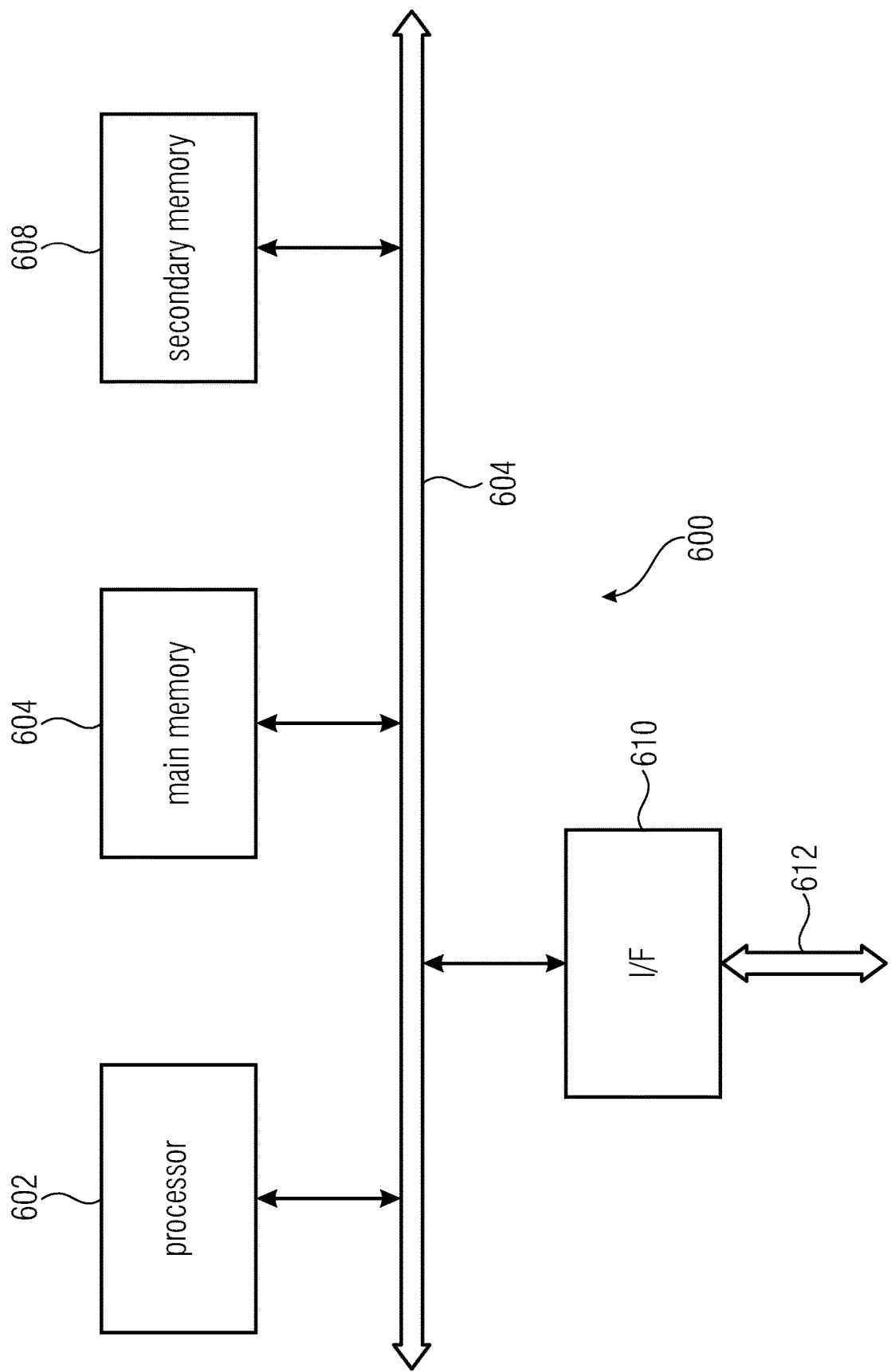
FIG. 20 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 20 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

| | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |
| mRP | Mini Resource Pool |

The invention claimed is:

1. A user device (UE) for a wireless communication system, the wireless communication system comprising a plurality of base stations and one or more further user devices (UEs), and providing one or more sets of sidelink resources for a sidelink, wherein
the UE is configured to be connected to
a base station for a communication with the base station, and
the one or more further UEs via the sidelink for a sidelink communication within a group of user devices, the group of user devices including the UE and one or more further UEs, and
the UE is configured to
request from the base station, directly or indirectly, resources to be used for the sidelink communication within the group of user devices, and
acquire from the base station, directly or indirectly, information about at least one of the sets of resources to be used exclusively for the sidelink communication within the group of user devices,
wherein, to request from the base station the resources to be used for the sidelink communication within the group of user devices, the UE is configured to
determine an amount of resources required for the sidelink communication within the group of user devices, and
request the amount of resources from the base station,
wherein the UE is configured to determine the amount of resources based on quality of service (QoS) information, and
wherein the at least one set of sidelink resources includes a plurality of bandwidth parts having different numerologies, and the UE is to obtain resources for the sidelink transmission within the group of user devices from one or more of the plurality of bandwidth parts having a numerology required for meeting a QoS requirement.

2. The user device (UE) of claim 1, wherein the UE is to receive from the base station a downlink control information (DCI) message which, with respect to a groupcast communication, comprises information about one or more of the following: a group ID, a lowest index of a sub-channel allocation to an initial transmission for the group of user devices, and a frequency resource location of an initial transmission and retransmission for the group of user devices.

3. The user device (UE) of claim 1, wherein the UE is configured to
  in case resources from the at least one set of sidelink resources are allocated to the UE, select for a transmission among group members the allocated resources from the at least one set of sidelink resources, or
  in case resources from the at least one set of sidelink resources are not allocated to the UE, scan and sense the at least one set of sidelink resources for resources with a lower probability of collision so as to select for a transmission among group members resources with a lower probability of collision, or
  in case resources from the at least one set of sidelink resources are not allocated to the UE, randomly select for a transmission among group members resources from the at least one set of sidelink resources, or
  in case only a part of the resources from the at least one set of sidelink resources is allocated to the UE, responsive to a signaling allowing the UE to use one or more of remaining free or unused resources,
    scan and sense the remaining free or unused resources for resources with a lower probability of collision so as to select for a transmission among group members the resources with the lower probability of collision, or randomly select for a transmission among group members resources from the remaining free or unused resources, and
    signal those resources from the remaining free or unused resources which are used by the UE.

4. The user device (UE) of claim 3, wherein resources from the at least one set of sidelink resources are allocated using a precise resource assignment indicating a time/frequency grid to be used, and/or using a listen-before-talk (LBT), within the at least one set of sidelink resources.

5. The user device (UE) of claim 1, wherein the UE is configured to determine the amount of resources needed based on one or more of the following parameters or based on a combination of one or more of the following parameters:
  a size of the group of user devices,
  a desired numerology of the sets of sidelink resources,
  an amount of data needed to perform critical groupcast specific communications,
  a latency,
  a reliability,
  a communication range,
  a QoS class identifier (QCI), and
  a 5G QoS indicator (5QI) metrics.

6. The user device (UE) of claim 1, wherein the at least one set of sidelink resources belongs to a first number of resources provided by the base station for exclusive use by one or more groups of user devices.

7. The user device (UE) of claim 1, wherein, in case the UE leaves a coverage area of the base station, the UE is configured to
  retain a current sidelink resource configuration, or
  retain a current sidelink resource configuration until a timer expires, or
  retain a current sidelink resource configuration until an event is triggered, or
  use a predefined sidelink resource configuration provided by the base station, or
  use a sidelink resource configuration which is hard-coded in the UE.

8. The user device (UE) of claim 1, wherein the UE is configured to
  acquire directly from the base station the information about the at least one set of sidelink resources to be used for transmissions within the group of user devices, and
  inform the one or more further UEs of the group of user devices about the at least one set of sidelink resources to be used for transmissions within the group of user devices, and
  for a communication within the group of user devices, only the UE is configured to request from the base station the at least one set of sidelink resources, and the one or more further UEs of the group of user devices do not request any resources from the base station but communicate within the group of user devices using only the resources within the at least one set of sidelink resources.

9. The user device (UE) of claim 8, wherein, to inform the one or more further UEs of the group of user devices about the at least one set of sidelink resources to be used for transmissions within the group of user devices, the UE is configured to
  transmit information about the at least one set of sidelink resources using a configuration control message, the configuration control message comprising at least a group ID and time and frequency parameters defining the at least one set of sidelink resources.

10. The UE of claim 9, wherein the one or more further UEs of the group of user devices, responsive to the configuration control message, listens only to a control channel in the at least one set of sidelink resources, and not to control channels in the at least one set of sidelink resources provided by the base station for exclusive use by one or more groups of user devices.

11. The UE of claim 8, wherein the UE is configured to reserve in the at least one set of sidelink resources first resources for a transmission by itself, and to allocate the remaining resources from the at least one set of sidelink resources to the one or more further UEs of the group of user devices so that other UEs listen/receive transmission on the first resources.

12. A group of user devices (UEs) in a wireless communication system, the wireless communication system comprising a plurality of base stations and a plurality of user devices, the group of user devices comprising
  one or more first UEs, and
  one or more second UEs,
  wherein the one or more first UEs comprise at least one group leader (GL UE), wherein the at least one GL UE is configured to
    be connected to a base station for a communication with the base station,
    be connected to the one or more second UEs via a sidelink for a sidelink communication with the one or more further UEs, and
    request directly from the base station resources to be used for the sidelink communication within the group of user devices,
    acquire directly from the base station information about at least one set of sidelink resources to be used for the sidelink communication within the group of user devices, each of the sets of resources being only or exclusively used within the group of user devices, and inform the one or more second UEs of the group of user devices about the resources to be used for transmissions within the group of user devices, wherein, to request from the base station the resources to be used for the sidelink communication within the group of user devices, the at least one GL UE is configured to determine an amount of resources required for the sidelink communication within the group of user devices, and request the amount of resources from the base station, wherein the at least one GL UE is configured to determine the amount of resources based on quality of service (QoS) information, and wherein the at least one set sidelink resources includes a plurality of bandwidth parts having different numerologies, and the at least one GL UE is to obtain resources for the sidelink transmission within the group of user devices from one or more of the plurality of bandwidth parts having a numerology required for meeting a QoS requirement.

13. The group of UEs of claim 12, wherein the group of user devices extends starting from a first group member in a group extension direction, and further group members are positioned along the group extension direction, and wherein the at least one GL UE is positioned at a certain position in the group of user devices.

14. A wireless communication network, comprising:
one or more base stations, and
one or more groups of user devices, each group of the one or more groups of user devices comprising
one or more first UEs, and
one or more second UEs,
wherein the one or more first UEs comprise at least one group leader (GL UE) and wherein the at least one GL UE is configured to
be connected to a base station for a communication with the base station,
be connected to the one or more second UEs via a sidelink for a sidelink communication with one or more further UEs, and
request from the base station, directly, resources to be used for the sidelink communication within the group of user devices,
acquire from the base station, directly, information about at least one set of sidelink resources to be used for the sidelink communication within the group of user devices, each of the sets of resources being only or exclusively used within the group of user devices, and
inform the one or more second UEs of the group of user devices about the resources to be used for transmissions within the group of user devices,
wherein, to request from the base station the resources to be used for the sidelink communication within the group of user devices, the at least one GL UE is configured to
determine an amount of resources required for the sidelink communication within the group of user devices, and
request the amount of resources from the base station, wherein the at least one GL UE is configured to determine the amount of resources based on quality of service (QoS) information, and wherein the at least one set sidelink resources includes a plurality of bandwidth parts having different numerologies, and the at least one GL UE is to obtain resources for the sidelink transmission within the group of user devices from one or more of the plurality of bandwidth parts having a numerology required for meeting a QoS requirement.

15. A method for operating a user device (UE) of a wireless communication system comprising a plurality of base stations and a plurality of user devices (UEs) including the UE and one or more further user devices (UEs), the UE connected to a base station for a communication with the base station, and to the one or more further UEs via a sidelink for a sidelink communication with the one or more further UEs, the UE and the one or more further UEs forming a group of user devices, the method comprising:

requesting from a base station, directly or indirectly, resources to be used for the sidelink communication with the one or more further UEs of the group of user devices, and acquiring from the base station, directly or indirectly, information about at least one set of sidelink resources to be used for the sidelink communication within the group of user devices, each of the sets of resources being only or exclusively used within the group of user devices, wherein requesting from the base station the resources to be used for the sidelink communication within the group of user devices comprises:
determining an amount of resources required for the sidelink communication within the group of user devices, and
requesting the amount of resources from the base station, wherein the amount of resources is determined based on quality of service (QoS) information, and wherein the at least one set sidelink resources includes a plurality of bandwidth parts having different numerologies, and the UE is to obtain resources for the sidelink transmission within the group of user devices from one or more of the plurality of bandwidth parts having a numerology required for meeting a QoS requirement.

16. A non-transitory digital storage medium having a computer program stored thereon to perform, when run by a computer, a method for operating a user device (UE) of a wireless communication system comprising a plurality of base stations and a plurality of user devices (UEs) including the UE and one or more further user devices (UEs), the UE connected to a base station for a communication with the base station, and to the one or more further UEs via a sidelink for a sidelink communication with the one or more further UEs, the UE and the one or more further UEs forming a group of user devices, the method comprising:

requesting from a base station, directly or indirectly, resources to be used for the sidelink communication with the one or more further UEs of the group of user devices, and acquiring from the base station, directly or indirectly, information about at least one set of sidelink resources to be used for the sidelink communication within the group of the user devices, each of the sets of resources being only or exclusively used within the group of user devices, wherein requesting from the base station the resources to be used for the sidelink communication within the group of user devices comprises:
  determining an amount of resources required for the sidelink communication within the group of user devices, and
  requesting the amount of resources from the base station,
wherein the amount of resources is determined based on quality of service (QoS) information, and
wherein the at least one set sidelink resources includes a plurality of bandwidth parts having different numerologies, and the UE is to obtain resources for the sidelink transmission within the group of user devices from one or more of the plurality of bandwidth parts having a numerology required for meeting a QoS requirement.

* * * * *